United States Patent
Qi et al.

(10) Patent No.: US 12,474,837 B2
(45) Date of Patent: Nov. 18, 2025

(54) BANDWIDTH CONTROL METHOD AND STORAGE DEVICE

(71) Applicant: Samsung Electronics Co., Ltd., Suwon-si (KR)

(72) Inventors: Hui Qi, Suzhou Industrial Park (CN); Jing Xia, Suzhou Industrial Park (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 14 days.

(21) Appl. No.: 18/347,190

(22) Filed: Jul. 5, 2023

(65) Prior Publication Data
US 2024/0393953 A1    Nov. 28, 2024

(30) Foreign Application Priority Data
May 26, 2023   (CN) .......................... 202310613788.2

(51) Int. Cl.
*G06F 3/00*   (2006.01)
*G06F 3/06*   (2006.01)

(52) U.S. Cl.
CPC .......... *G06F 3/0613* (2013.01); *G06F 3/0629* (2013.01); *G06F 3/0673* (2013.01)

(58) Field of Classification Search
CPC .... G06F 3/0613; G06F 3/0629; G06F 3/0673; G06F 9/5016; G06F 9/5022; G06F 9/5011; G06F 11/3466
See application file for complete search history.

(56) References Cited

U.S. PATENT DOCUMENTS

| | | | |
|---|---|---|---|
| 9,515,956 B2 | 12/2016 | Hu et al. | |
| 10,853,219 B2 | 12/2020 | Loteanu | |
| 10,956,060 B2 | 3/2021 | Lee et al. | |
| 11,032,373 B1 | 6/2021 | Mallick et al. | |
| 2015/0095489 A1* | 4/2015 | Makida | G06F 3/061 709/224 |
| 2019/0028407 A1 | 1/2019 | Perumal Vijayan et al. | |
| 2019/0179570 A1 | 6/2019 | Bahirat et al. | |
| 2019/0305931 A1* | 10/2019 | Borst | H04L 9/0637 |
| 2021/0006501 A1 | 1/2021 | Ong | |
| 2021/0286517 A1* | 9/2021 | Karr | G06F 3/0688 |
| 2021/0398187 A1* | 12/2021 | Tennur Narayanan | G06Q 30/012 |
| 2023/0146540 A1 | 5/2023 | Lee | |

OTHER PUBLICATIONS

Extended European Search Report dated Feb. 12, 2024 for corresponding European Application No. 23195838.0.
Jingpei Yang et al., "Don't stack your Log on my Log", INFLOW'14, Oct. 5, 2014.

* cited by examiner

*Primary Examiner* — Midys Rojas
(74) *Attorney, Agent, or Firm* — Harness, Dickey & Pierce, P.L.C.

(57) ABSTRACT

A bandwidth control method and a storage device are provided. The bandwidth control method may include: determining a target bandwidth expected when an application uses a storage device; calculating a bandwidth difference between the target bandwidth and an allocation bandwidth allocated to the application by the storage device; and adjusting the allocation bandwidth to the target bandwidth based on the bandwidth difference.

20 Claims, 11 Drawing Sheets

BANDWIDTH CONTROL METHOD AND STORAGE DEVICE

CROSS-REFERENCE TO RELATED APPLICATION

This application is based on and claims priority under 35 U.S.C. § 119 to Chinese Patent Application No. 202310613788.2, filed on May 26, 2023, in the Chinese Intellectual Property Office, the disclosure of which is incorporated by reference herein in its entirety.

BACKGROUND

Various example embodiments relate to the storage field, and more specifically, to bandwidth control methods and/or storage devices.

Recently, storage devices such as one or more of Solid State Drive (SSD) (e.g., Zoned Namespace Solid State Drive (ZNS SSD)), Non-Volatile Memory express (NVMe), Embedded Multi Media Card (eMMC), Universal flash memory (UFS), etc. have been widely used.

Usually, different applications may use a same storage device with a same bandwidth. However, applications often have various loads in different scenarios, and the various loads may lead to different bandwidth requirements or expectations. As a result, with a fixed bandwidth, some applications may have insufficient bandwidth and/or others may have wasted bandwidth. As a result, it may be difficult or impossible to balance the bandwidth actually used by different applications and to more effectively utilize the bandwidth of the storage device, which has difficulty in meeting the needs or expectations of users.

SUMMARY

Some example embodiments may provide a bandwidth control method and a storage device.

According to some example embodiments, a bandwidth control method is provided, and the bandwidth control method comprises: determining a target bandwidth expected when an application uses a storage device; calculating a bandwidth difference between the target bandwidth and an allocation bandwidth allocated to the application by the storage device; and adjusting the allocation bandwidth to the target bandwidth based on the bandwidth difference.

According to some example embodiments, a storage device is provided, and the storage device comprises: a memory device comprising a plurality of memory units configured to store data for an application; a processor configured to: execute machine-readable instructions to determine a target bandwidth expected when the application uses the storage device; calculate a bandwidth difference between the target bandwidth and an allocation bandwidth allocated to the application by the storage device; and adjust the allocation bandwidth to the target bandwidth based on the bandwidth difference.

According to the bandwidth control method of various example embodiments, since the average bandwidth of multiple past time periods (for example, three time periods) may be calculated as the usage bandwidth of the application, it may possible to avoid or reduce the impact of burst input and output (IO) traffic on the real bandwidth, and thus the usage bandwidth of the application may be more accurately calculated. Alternatively or additionally, in some example embodiments, IO bursts may be handled more smoothly, helping to eliminate bandwidth spikes and achieve better quality of service (QoS).

Alternatively or additionally according to the bandwidth control method of various example embodiments, the allocation bandwidth of an application may be adjusted based on the bandwidth difference between the target bandwidth that may be beneficial for the operation of the application and/or the reasonable bandwidth allocation of the storage device and the allocation bandwidth. Therefore, excessive bandwidth for applications with lighter workloads may be avoided or reduced in likelihood of occurrence, and/or the bandwidth shortage problem for applications with higher workloads, may be improved, which may improve the bandwidth utilization rate of ZNS-SSD.

Alternatively or additionally according to the bandwidth control method of various example embodiments, when the target bandwidth of the application is greater than the allocation bandwidth of the application, additional zones may be allocated to the application to adjust the allocation bandwidth of the application to be the target bandwidth greater than the allocation bandwidth. Therefore, the problem of insufficient bandwidth for applications with higher workloads may be improved, thereby improving the bandwidth utilization rate of the ZNS SSD.

Alternatively or additionally according to the bandwidth control method of various example embodiments, even if the number of the zones corresponding to the difference do not exist in the free zone pool, the processor may still try to meet the number of the zones corresponding to the difference by adjusting the number of the zones in the free zone pool.

Alternatively or additionally, according to the bandwidth control method of various example embodiments, regardless of whether the number of the zones in the free zone pool is sufficient or not, the allocation bandwidth of the application may be adjusted to the target bandwidth so as to be greater than or equal to the allocation bandwidth, thereby improving the problem of insufficient bandwidth for applications with higher workloads.

Alternatively or additionally, according to the bandwidth control method of various example embodiments, since priority can be given to ensuring or helping to ensure the bandwidth usage of high-priority applications when the number of the zones in the free zone pool is insufficient, so that the high-priority applications are normally and stably run, user experience may be improved.

Alternatively or additionally according to the bandwidth control method of various example embodiments, when the target bandwidth of the application is less than the allocation bandwidth of the application, the allocation bandwidth of the application may be reduced to be the target bandwidth less than the allocation bandwidth by releasing a portion of the zones used by the application. Therefore, the problem of bandwidth waste for applications with lower workloads may be improved, which may improve the bandwidth utilization rate of the ZNS SSD.

BRIEF DESCRIPTION OF THE DRAWINGS

The above and other objects and features of various example embodiments will become clearer by the following description in conjunction with the accompanying drawings showing an example, wherein.

DETAILED DESCRIPTION

Figure 1:
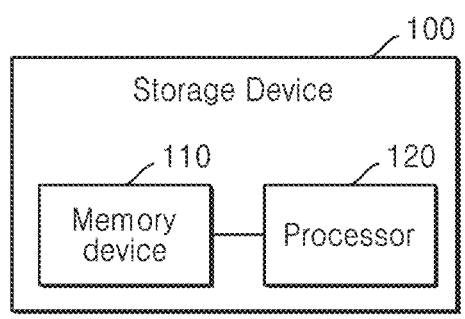
FIG. 1 is a block diagram illustrating a storage device according to various example embodiments.

The following detailed description is provided to assist in gaining a comprehensive understanding of the methods, apparatuses, and/or systems described herein. However, various changes, modifications, and equivalents of the methods, apparatuses, and/or systems described herein will be apparent after an understanding of various example embodiments. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of various example embodiments may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, the component may be directly "connected to," or "coupled to" the other component, or there may be one or more other components intervening therebetween. In contrast, when an element is described as being "directly connected to," or "directly coupled to" another element, there may be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or various example embodiments (e.g., as to what an example or example embodiment may include or implement) means that at least one example or example embodiment exists where such a feature is included or implemented, while example embodiments are not limited thereto.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Hereinafter, examples will be described in detail with reference to the accompanying drawings.

FIG. 1 is a block diagram illustrating a storage device according to various example embodiments.

Referring to FIG. 1, the storage device 100 may include a memory device 110 and a processor 120. Although not shown in FIG. 1, the storage device 100 may be connected to and/or communicate with an external memory, e.g., wiredly connected and/or wirelessly connected to an external memory. The storage device 100 shown in FIG. 1 may include components associated with the current example. Therefore, it may be clear to those of ordinary skill in the art that the storage device 100 may also include other general components in addition to those shown in FIG. 1.

Here, the storage device 100 may be or may include any storage device that may perform bandwidth adjustment. As an example only, the storage device 100 may include one or more of random access memory (RAM) (such as dynamic random access memory (DRAM) or static random access memory (SRAM)), read-only memory (RAM), electrically erasable programmable read-only memory (EEPROM), CD-ROM, Blu-ray optical disk, optical disk storage device, hard disk drive (HDD), solid-state drive (SSD), and/or flash memory.

In some example embodiments, the storage device 100 may correspond to a zoned namespace solid-state drive (ZNS SSD). A ZNS SSD is a type of storage device whose space (e.g., memory cells of the memory device 110) is divided into multiple zones (ZONE). The ZNS SSD may expose zones to the host, and the host may determine whether to write data to or read data from a specific zone. Due to the fixed bandwidth of the ZNS SSD, the number of zone stripes is fixed and may not be changed at runtime. Therefore, the ZNS SSD may be difficult to meet or exceed various bandwidth requirements or expectations of various applications. For example, in some ZNS SSDs, there may be a problem that some applications lack bandwidth and some applications waste bandwidth on drives. As a result, it may be difficult or impossible to balance the bandwidth on different applications, and/or it may be difficult to utilize the bandwidth of the drive.

Alternatively or additionally, the storage device 100 may be implemented in various types of devices such as one or more of personal computers (PCs), server devices, mobile devices, embedded devices, and the like. In detail, the storage device 100 may be included in, but not limited to, one or more of smart phones, tablet devices, augmented reality (AR) devices, Internet of Things (IoT) devices, autonomous vehicles, robotic devices, or medical devices that may store data.

The memory device 110 may include or correspond to multiple memory cells for storing data for the application. For example, in the case where the storage device 100 corresponds to a ZNS SSD, multiple storage units or cells may be managed in the form of zones.

The processor 120 may control the overall functionality of the storage device 100. For example, processor 120 may typically control storage device 100 by executing programs that are stored in memory device 110. Processor 120 may be implemented as one or more of a central processing unit (CPU), graphics processing unit (GPU), or application processor (AP) included in storage device 100, but is not limited thereto.

Here, the processor 120 may control the bandwidth management operation of the storage device 100, for example based on executing machine-readable instructions, which may be stored at the memory device 110, the processor 120, or the like. For example, when instructions are performed in the processor, the processor 120 may be configured to: determine a target bandwidth expected when an application uses a storage device; calculate a bandwidth difference corresponding to a difference between the target bandwidth and an allocation bandwidth allocated to the application by the storage device; and adjust the allocation bandwidth to the target bandwidth based on the bandwidth difference. Such adjustment may provide more efficient and/or effective utilization of bandwidth by the application, which may improve performance of the application and thus may improve performance of a device, system, data center, or the like according to any of the example embodiments implementing the application and thus may further improve the user experience of a user supported by the a device, system, data center, or the like according to any of the example embodiments. In addition, such adjustment may improve performance of the storage device 100 based on causing the storage device to more efficiently allocate bandwidth to applications using the storage device 100 so that that the bandwidth allocation to said applications more closely corresponds to the target bandwidth.

In the following, an example of the bandwidth control method performed by the processor 120 will be described with reference to FIGS. 2 to 5.

Figure 2:
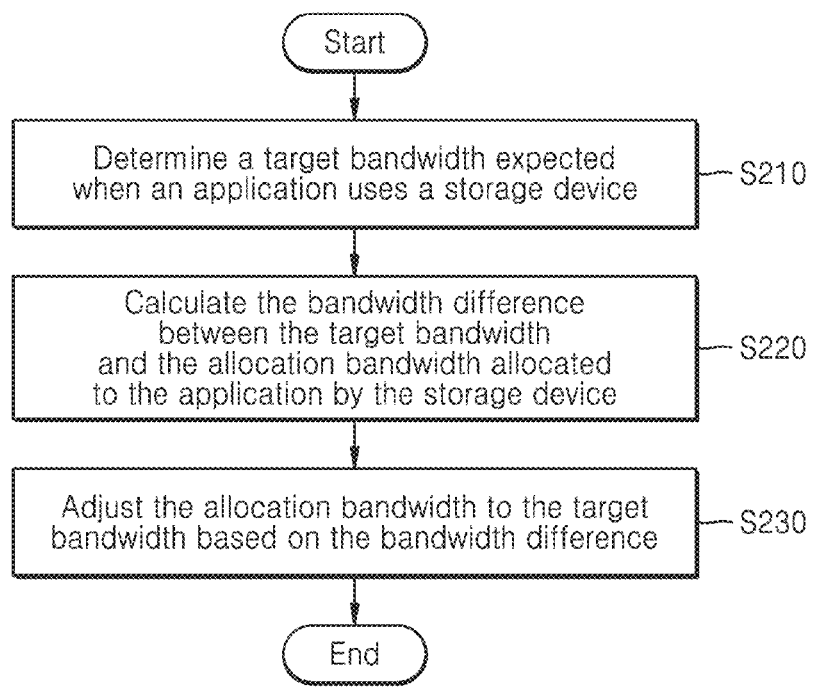
FIG. 2 is a flowchart illustrating a bandwidth control method performed by a processor according to various example embodiments.

FIG. 2 is a flowchart illustrating a bandwidth control method performed by a processor according to various example embodiments. Such a processor may be the processor 120 of storage device 100 as shown in FIG. 1.

Referring to FIG. 2, in operation S210, the processor may determine a target bandwidth that is expected when an application uses a storage device.

The target bandwidth may be beneficial for the operation of the application and/or for the reasonable bandwidth allocation of the storage device.

In some example embodiments, the processor may calculate a usage bandwidth when the application uses the storage device, and may determine the target bandwidth based on the usage bandwidth. Here, the usage bandwidth may be or may be based on a bandwidth actually used by the application. For example, the target bandwidth is or is based on the bandwidth associated with the usage bandwidth. In one example, the target bandwidth may be the usage bandwidth. However, example embodiments are not limited thereto, and the target bandwidth may be a value such as a dynamically defined, or predefined value (e.g., a value stored at a memory device of the storage device and accessed by the processor) that is close to the usage bandwidth (for example, a value obtained by adding the usage bandwidth to a particular or predetermined bandwidth, and/or a value obtained by subtracting the usage bandwidth from the particular or predetermined bandwidth). In addition, the target bandwidth may be any other bandwidth that is beneficial for the operation of the application and/or for the reasonable bandwidth allocation of the storage device.

In one example, the processor may calculate the usage bandwidth when (e.g., in response to a determination that) the application uses the storage device for each time period (T). The usage bandwidth may be a required or desired bandwidth for write requests and/or read requests for the application during the time period T. For example, the usage bandwidth of the application may be calculated using the following equation (1):

$$\text{Usage bandwidth} = (\text{data amount of communication corresponding to time period T})/T \quad \text{(Equation 1)}$$

The data amount of the communication corresponding to the time period T may correspond to the size of data communicated with the storage device during the time period T. For example, the unit of the bandwidths may be MB/s (megabytes per second). However, the above units are only examples, and example embodiments are not limited thereto. In one example, the processor may periodically calculate the usage bandwidth of the application.

In addition, in some example embodiments, the processor may detect a plurality of data amount that is communicated between the application and the storage device during each time period of a plurality of time periods, respectively, wherein each time period corresponds to a same time interval or same amount of time (for example, the above time period T). The processor may then obtain a plurality of sub-bandwidths respectively by dividing the plurality of data amount by the time interval (e.g., the same amount of time), and determine the average of the plurality of sub-bandwidths as the target bandwidth.

In some example embodiments, the average may be a measure of central tendency. For example, in some example embodiments, the average may be a value based on one or more of the mean, the median, or the mode.

In some example embodiments, since the processor may calculate a value corresponding the average bandwidth of multiple past time periods (for example, three time periods) as the usage bandwidth of the application, it may be possible to avoid or reduce the impact of burst input and output (IO) traffic on the real bandwidth, and thus the usage bandwidth of the application may be more accurately calculated, enabling the adjusted bandwidth allocation to be more accurate and thus improve operational efficiency and/or performance of the storage device. Additionally or alternatively, in some example embodiments, IO bursts may be handled smoothly, helping to eliminate bandwidth spikes and achieve better quality of service (QoS).

In operation S220, the processor may calculate the bandwidth difference based on a difference between the target bandwidth and the allocation bandwidth allocated to the application by the storage device.

Here, the allocation bandwidth of the application may be obtained in one or more of various ways. In one example, the allocation bandwidth for the application may be determined for various conditions. For example, the allocation bandwidth corresponding to a first operation mode of the application may be determined, and the allocation bandwidth corresponding to a second operation mode of the application may be determined. However, example embodiments are not limited thereto, and various conditions may also be any other condition. In addition, the allocation bandwidth of the application may also be obtained directly from the parameters related to the allocation bandwidth of the storage device.

In operation S230, the processor may adjust the allocation bandwidth to the target bandwidth based on the bandwidth difference.

As described above, the target bandwidth may be beneficial for the operation of the application and/or for the reasonable bandwidth allocation of the storage device. Therefore, according to the bandwidth control method of various example embodiments, the allocation bandwidth of an application may be adjusted based on the bandwidth difference between the target bandwidth that is beneficial for the operation of the application and/or the reasonable bandwidth allocation of the storage device and the allocation bandwidth. Therefore, excessive bandwidth for applications with lighter workloads may be avoided or reduced in likelihood of occurrence, and there may be an improvement in the bandwidth shortage problem for applications with higher workloads, thereby improving the bandwidth utilization rate of ZNS-SSD, thereby improving the operational efficiency and/or operational performance of a storage device based on a processor of the storage device performing the bandwidth control method with regard to one or more applications using the storage device, both in terms of enabling applications to utilize sufficient bandwidth to be implemented without loss in performance (and thus improve performance of devices implementing the applications) and in terms of enabling a storage device to allocate bandwidth more efficiently and effectively to the various applications using the storage device and thus to reduce waste of allocated bandwidth (e.g., allocate excess bandwidth to applications that do not utilize the excess bandwidth).

Operation S230 will be described in more detail below in conjunction with FIGS. 3 to 5.

Figure 3:
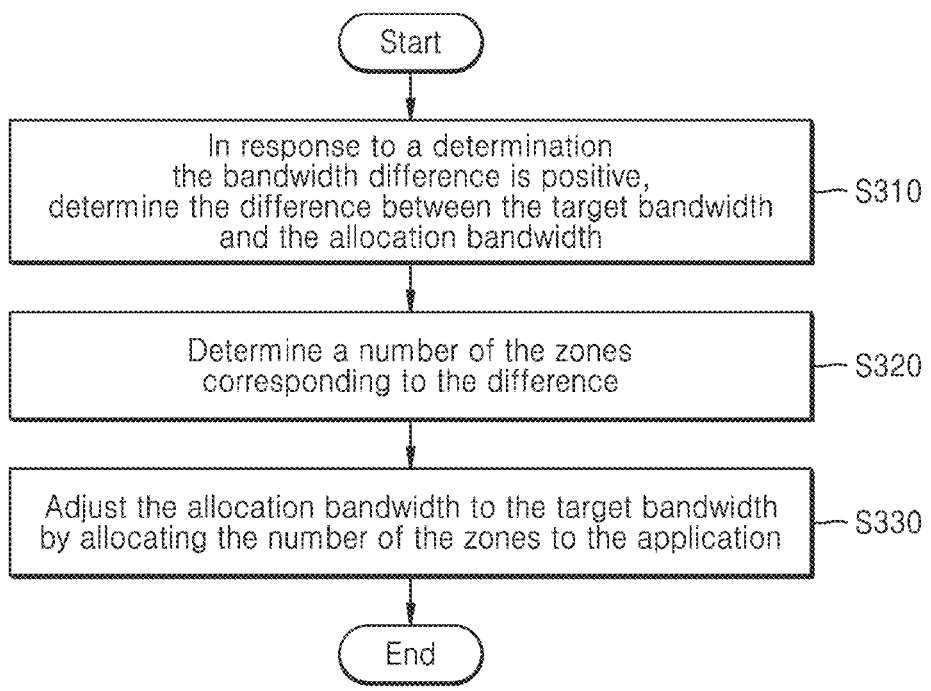
FIG. 3 is a flowchart illustrating a bandwidth adjustment method performed by a processor according to various example embodiments.

FIG. 3 is a flowchart illustrating a bandwidth adjustment method performed by a processor according to various example embodiments. Such a processor may be the processor 120 of storage device 100 as shown in FIG. 1.

The example bandwidth adjustment method in FIG. 3 may correspond to a bandwidth adjustment method where the bandwidth difference between the application's target bandwidth and the application's allocation bandwidth is positive such that the target bandwidth is a bandwidth greater than the allocation bandwidth.

Referring to FIG. 3, in operation S310, in response to a determination (e.g., a determination by the processor implementing the bandwidth adjustment method) that the bandwidth difference is positive, the processor determines the difference between the target bandwidth and the allocation bandwidth.

In operation S320, the processor may determine (e.g., identify, select, etc.) a number (e.g., quantity) of the zones (e.g., a number of memory cells of the storage device 100) corresponding to the difference.

In a case that the storage device 100 corresponds to a ZNS SSD, the bandwidth corresponding to a zone of the storage device 100 may be fixed. Therefore, the number of the zones corresponding to the difference may be obtained based on the difference between the target bandwidth and the allocation bandwidth and the bandwidth corresponding to a single zone.

In operation S330, the processor may adjust the allocation bandwidth to the target bandwidth by allocating the number of the zones (e.g., the number corresponding to the difference) to the application.

For example, according to the bandwidth control method of various example embodiments, when the target bandwidth of the application is greater than the allocation bandwidth of the application, additional zones may be allocated to the application to adjust the allocation bandwidth of the application to be the target bandwidth greater than the allocation bandwidth. Therefore, the problem of insufficient bandwidth for applications with higher workloads is improved, thereby improving the bandwidth utilization rate of the ZNS SSD.

In addition, bandwidth utilization of ZNS-SSD, and thus operational performance and/or efficiency of the ZNS-SSD, may be improved when the allocation bandwidth is set to the target bandwidth.

Operation S320 will be described in more detail below in conjunction with FIG. 4.

Figure 4:
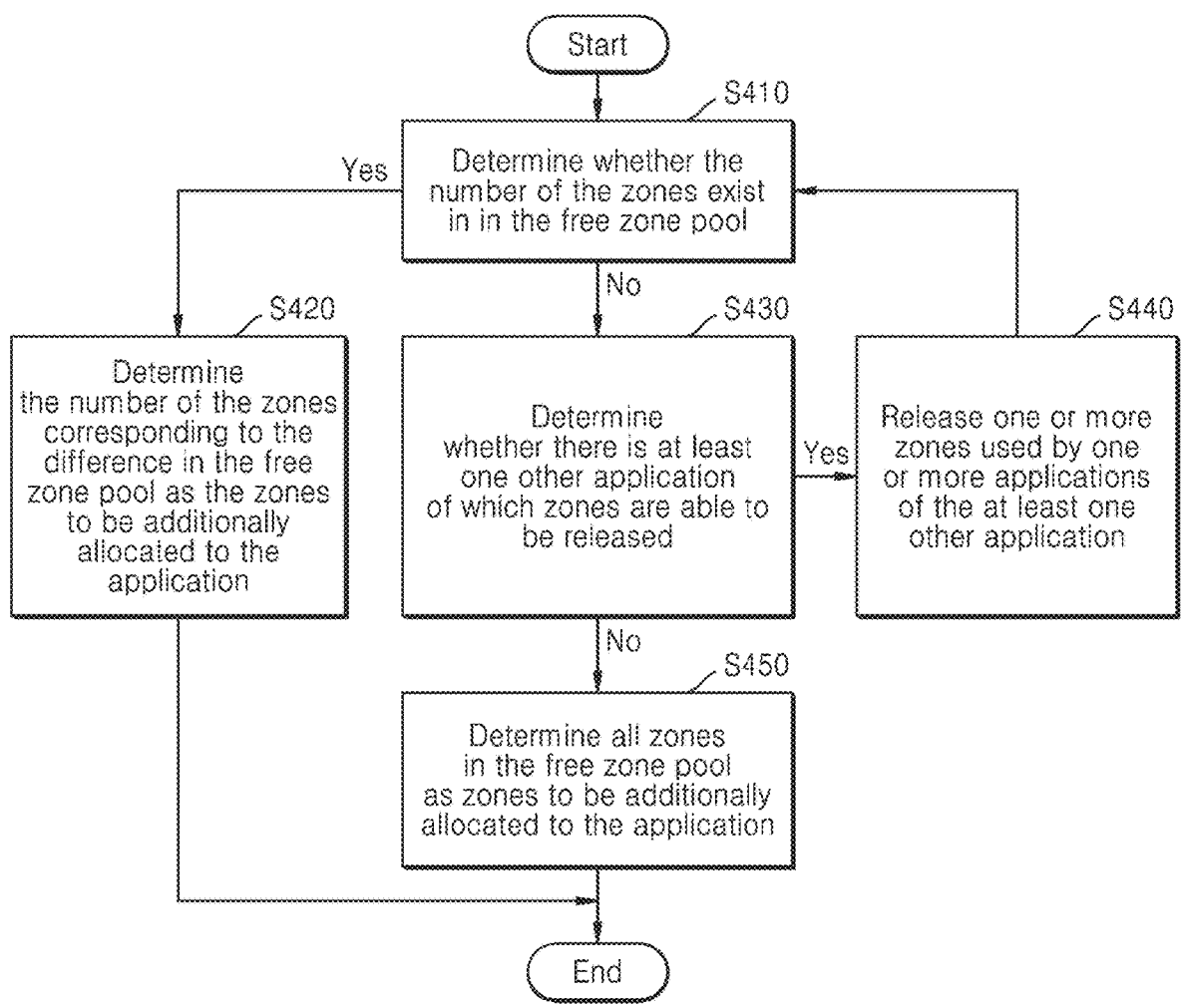
FIG. 4 is a flowchart illustrating a bandwidth adjustment method performed by a processor according to various example embodiments.

FIG. 4 is a flowchart illustrating a bandwidth adjustment method performed by the processor according to various example embodiments. Such a processor may be the processor 120 of storage device 100 as shown in FIG. 1.

Referring to FIG. 4, at operation S410, the processor may determine whether a number of zones corresponding to the difference determined at operation S310 exist in the free zone pool (e.g., are available in the free zone pool, are presently not allocated to bandwidth, etc.).

Here, the free zone pool may include unallocated zones (e.g., unallocated memory cells) in the storage device.

In operation S420, in response to determining that the number of the zones corresponding to the difference exist in the free zone pool, the processor may determine the number of the zones corresponding to the difference in the free zone pool as the zones to be additionally allocated to the application (i.e., the number of the zones corresponding to the difference that are determined in operation S320).

For example, when there is a sufficient number of zones in the free zone pool for additional allocation to the application, zones may be allocated directly from the free zone pool to the application, so that the allocation bandwidth of the application may be adjusted to the target bandwidth.

In response to determining that the number of the zones corresponding to the difference do not exist (e.g., are not available) in the free zone pool (e.g., there are insufficient unallocated zones corresponding to the difference), the processor may determine the number of the zones corresponding to the difference by (e.g., based on) adjusting the number of the zones in the free zone pool (e.g., adjusting the number of unallocated zones in the storage device) and further determine the number of the zones corresponding to the difference based on the adjusted number of the zones in the free zone pool.

Therefore, even if the number of the zones corresponding to the difference do not exist in the free zone pool, the processor may still try to meet or exceed the number of the zones corresponding to the difference by adjusting the number of the zones in the free zone pool (e.g., adjust the number of unallocated zones to correspond to the difference).

More specifically, in operation S430, in response to determining that the number of the zones corresponding to the difference do not exist in the free zone pool, the processor may determine whether there is at least one other application of which zones are able to be released (e.g., at least one other application where the allocated bandwidth is greater than the target bandwidth for the at least one other application by a difference that corresponds to one or more zones which are therefore able to be released from allocation to the at least one other application without affecting utilized bandwidth by the at least one other application). For example, the at least one other application may have a low priority of using the bandwidth. In various example embodiments, the at least one other application may not include applications of which the bandwidths have been reduced or minimized. In some example embodiments, since the zones allocated to the applications whose bandwidths have been reduced or minimized will not be released, it may be possible to maintain the normal operation of the applications (e.g., the at least one other application) whose bandwidths have been reduced or minimized.

When it is determined (e.g., in response to a determination) in operation S430 that there is the at least one other application of which the zones are able to be released, in operation S440, the processor may release one or more zones used by one or more applications of the at least one other application.

After performing operation S440, the processor may return to performing operation S410. For example, the processor may again determine whether the number of the zones corresponding to the difference determined at operation S310 exist in in the free zone pool.

When it is determined (e.g., in response to a determination) in operation S430 that that there is not at least one other application of which the zones are able to be released, in operation S450, the processor may determine all zones in the free zone pool as zones to be additionally allocated to the application (for example, zones corresponding to the number of the difference).

For example, even if there are no zones corresponding to the difference in the free zone pool, the processor may release zones used by the one or more other application and additionally allocate zones to the application, so that the application's bandwidth is adjusted to be or be closer to the target bandwidth, thereby improving performance of the application and thus of a device, system, data center, or the like according to any of the example embodiments implementing the application and thereby improving operational performance and/or efficiency of the storage device with regard to bandwidth allocation to support one or more applications.

According to the bandwidth control method of various example embodiments, regardless of whether the number of the zones in the free zone pool is sufficient or not, the allocation bandwidth of the application may be adjusted to the target bandwidth to be greater than or equal to the allocational bandwidth, thereby improving the problem of insufficient bandwidth for applications with higher workloads, thereby improving performance of the application and thus of a device, system, data center, or the like according to any of the example embodiments implementing the application and thereby improving operational performance and/or efficiency of the storage device with regard to bandwidth allocation to support one or more applications.

In one example, the priority of allocating a bandwidth to the at least one other application is lower than that of allocating a bandwidth to the application, and the bandwidth of the one or more applications after the one or more zone is released is greater than or equal to the minimum required, or expected or desired, bandwidth of the at least one other application. Here, the priority of different applications may be determined in advance.

According to the bandwidth control method of various example embodiments, since priority can be given to ensuring the bandwidth usage of high-priority applications when the number of the zones in the free zone pool is insufficient, so that the high-priority applications are normally and stably run, user experience may be improved, performance of the application and thus of a device, system, data center, or the like according to any of the example embodiments implementing the application may be improved, and thereby operational performance and/or efficiency of the storage device with regard to bandwidth allocation to support one or more applications may be improved.

Figure 5:
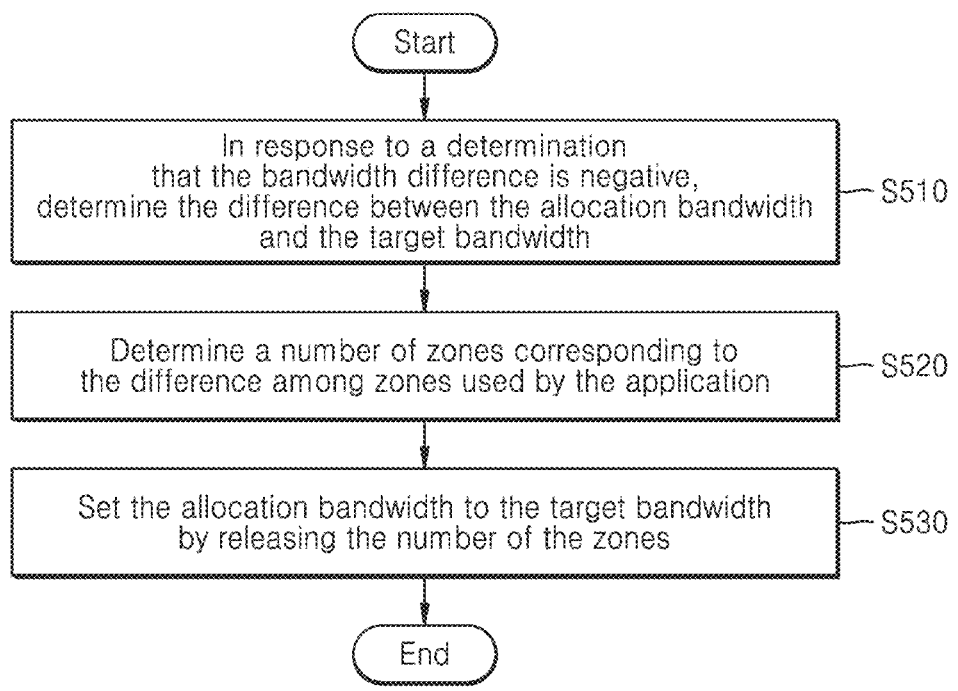
FIG. 5 is a flowchart illustrating a bandwidth adjustment method performed by a processor according to various example embodiments.

FIG. 5 is a flowchart illustrating a bandwidth adjustment method performed by a processor according to various example embodiments. Such a processor may be the processor 120 of storage device 100 as shown in FIG. 1.

The example bandwidth adjustment method in FIG. 5 may correspond to a bandwidth adjustment method when the bandwidth difference between the application's target bandwidth and the application's allocation bandwidth is negative, such that the target bandwidth is a bandwidth less than the allocation bandwidth.

Referring to FIG. 5, in operation S510, in response to a determination that the bandwidth difference is negative, the processor may determine the difference between the allocation bandwidth and the target bandwidth.

In operation S520, the processor may determine a number of zones corresponding to the difference among zones used by the application.

When the storage device 100 corresponds to a ZNS SSD, the bandwidth corresponding to a zone may be fixed. Therefore, the number of the zones corresponding to the difference may be obtained based on the difference between the allocation bandwidth and the target bandwidth and the bandwidth corresponding to a single zone.

In operation S530, the processor may set the allocation bandwidth to the target bandwidth by releasing the determined number of the zones.

According to the bandwidth control method of various example embodiments, when the target bandwidth of the application is less than the allocation bandwidth of the application, the allocation bandwidth of the application may be reduced to be the target bandwidth less than the allocation bandwidth by releasing a portion of the zones used by the application. Therefore, the problem of bandwidth waste for applications with lower workloads may be improved, thereby improving the bandwidth utilization rate of the ZNS SSD, thereby improving performance of the application using the ZNS SSD and thus of a device, system, data center, or the like according to any of the example embodiments implementing the application and thereby improving operational performance and/or efficiency of the ZNS SSD with regard to bandwidth allocation to support one or more applications.

The released zones may be included in the free zone pool, so that the free zone pool may have more zones to be allocated.

Here, the processor may be responsible for allocating zones to applications with insufficient bandwidth to improve concurrency and reclaim zones based on bandwidth difference. A processor may combine a set of zones into a single unit or single multizone. When a write request arrives, the processor divides a single request into multiple sub-requests and sequentially sends each sub request to a zone in the group. If the number of sub-requests is greater than the number of the zones in the group, the first zone may be wrapped again in a circular fashion. The sub acknowledgement (ACK) of sub requests from all zones is accumulated and then returned to the host.

Although the bandwidth control method according to various example embodiments is described herein as being performed by a processor, those of ordinary skill in the art should understand that one or more operations in the bandwidth control method according to various example embodiments may be implemented by one or more different modules in the processor, and the present disclosure does not limit specific modules.

Alternatively or additionally, some example embodiments propose to use a flexible zone number allocation strategy instead of a fixed zone number allocation strategy for multiple applications with various workloads, which may avoid or reduce excessive bandwidth for applications with light workloads and/or insufficient bandwidth for applications with heavy workloads.

Figure 6:
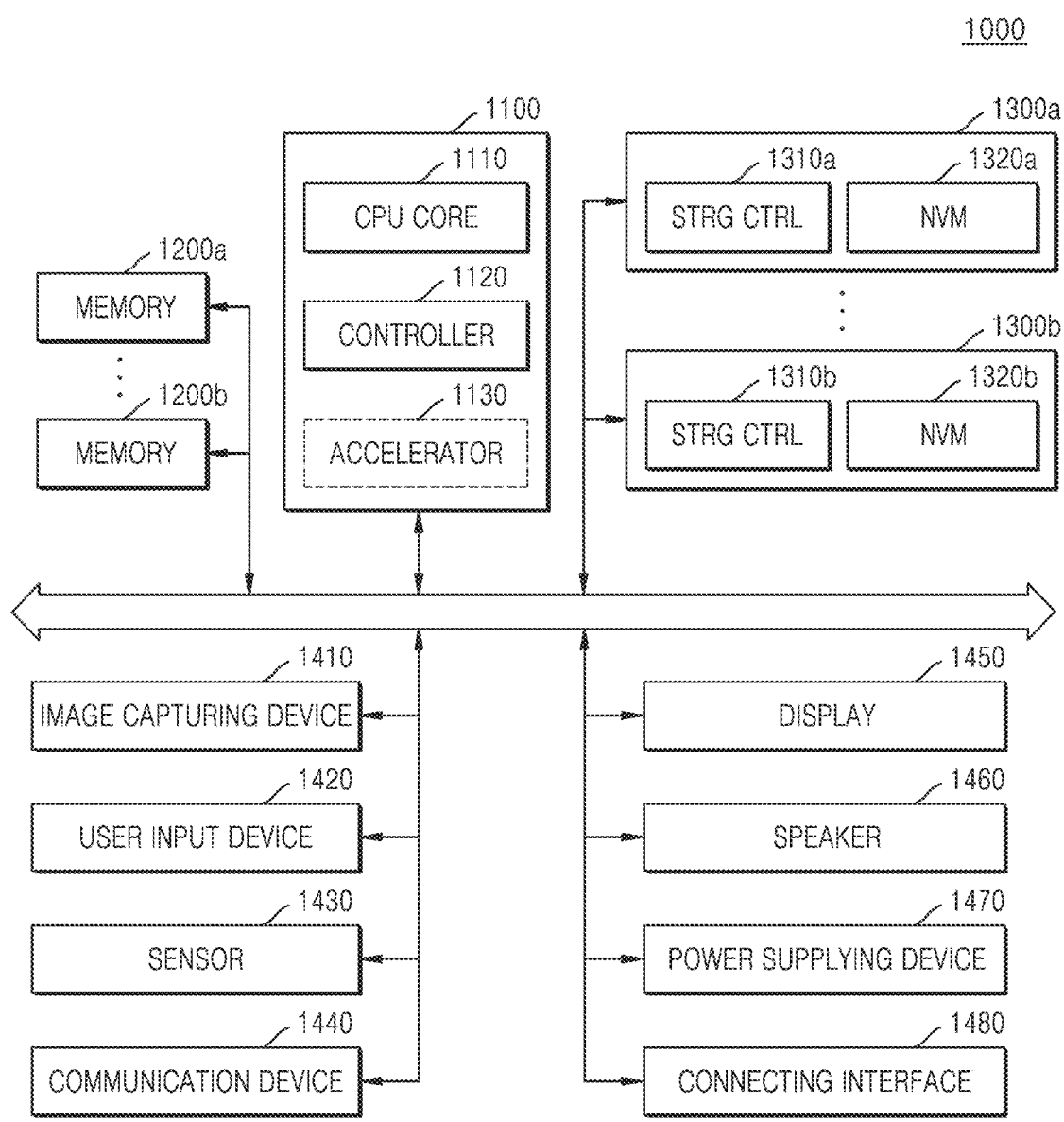
FIG. 6 is a schematic diagram of a system to which a storage device is applied according to some example embodiments.

FIG. 6 is a schematic diagram of a system 1000 to which a storage device is applied, according to some example embodiments. The system 1000 (such as an electronic system) of FIG. 6 may be, include, or be included in a mobile system, such as one or more of a portable communication terminal (e.g., a mobile phone), a smartphone, a tablet personal computer (PC), a wearable device, a healthcare device, or an Internet of things (IOT) device. However, the system 1000 of FIG. 6 is not necessarily limited to the mobile system and may be, include, or be included in a PC, a laptop computer, a server, a media player, or an automotive device (e.g., a navigation device).

Referring to FIG. 6, the system 1000 may include a main processor 1100, memories (e.g., 1200a and 1200b), and storage devices (e.g., 1300a and 1300b), where a and b may each independently be any integer. In addition, the system 1000 may include at least one of an image capturing device 1410, a user input device 1420, a sensor 1430, a communication device 1440, a display 1450, a speaker 1460, a power supplying device 1470, or a connecting interface 1480.

In some example embodiments, memories (e.g., 1200a and 1200b) and/or storage devices (e.g., 1300a and 1300b) may correspond to the storage device (e.g., storage device 100 shown in FIG. 1) or the device of storing data according to various example embodiments. In some example embodiments, memories (e.g., 1200a and 1200b) and/or storage devices (e.g., 1300a and 1300b) may be configured to function as (e.g., may be configured to implement) a main memory device, main storage device, or the like of the system 1000. For example, memories (e.g., 1200a and 1200b) and/or storage devices (e.g., 1300a and 1300b) may control a bandwidth of at least one of the memory or the storage device according any one bandwidth control method described with reference to at least one of FIGS. 2 to 5.

The main processor 1100 may control up to all operations of the system 1000, and more specifically, may control operations of other components included in the system 1000, for example based on executing machine-readable instructions which may be stored at the processor 1100, at one or more memories 1200a to 1200b, etc. The main processor 1100 may be implemented as one or more of a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some example embodiments, the main processor 1100 may further include an accelerator 1130, which is a dedicated circuit for a high-speed data operation, such as an artificial intelligence (AI) data operation. The accelerator 1130 may include one or more of a graphics processing unit (GPU), a neural processing unit (NPU) and/or a data processing unit (DPU) and be implemented as a chip that is physically separate from the other components of the main processor 1100.

The memories 1200a and 1200b may be used as main memory devices (e.g., main storage devices) of the system 1000. Although each of the memories 1200a and 1200b may include a volatile memory, such as static random access memory (SRAM) and/or dynamic RAM (DRAM), each of the memories 1200a and 1200b may independently include non-volatile memory, such as one or more of a flash memory, phase-change RAM (PRAM) and/or resistive RAM (RRAM) etc. The memories 1200a and 1200b may be implemented in the same package as the main processor 1100; however, example embodiments are not limited thereto.

The storage devices 1300a and 1300b may serve as (e.g., may be configured to function as) non-volatile storage devices configured to store data regardless of whether power is supplied thereto, and have larger storage capacities than the memories 1200a and 1200b. The storage devices 1300a and 1300b may respectively, e.g., independently, include storage controllers (STRG CTRL) 1310a and 1310b and NVM (Non-Volatile Memory) s 1320a and 1320b configured to store data via the control of the storage controllers 1310a and 1310b. Although the NVMs 1320a and 1320b may include flash memories having a two-dimensional (2D) structure and/or a three-dimensional (3D) V-NAND structure, the NVMs 1320a and 1320b may additionally or alternatively include other types of NVMs, such as PRAM and/or RRAM.

The storage devices 1300a and 1300b may be physically separated from the main processor 1100 and included in the system 1000 or implemented in the same package as the main processor 1100. Alternatively or additionally, the storage devices 1300a and 1300b may have types of solid-state devices (SSDs) and/or memory cards and be removably combined with other components of the system 1000 through an interface, such as the connecting interface 1480 that will be described below. The storage devices 1300a and 1300b may be or include devices to which a standard protocol, such as one or more of a universal flash storage (UFS), an embedded multi-media card (eMMC), or a non-volatile memory express (NVMe), is applied, without being limited thereto.

The image capturing device 1410 may capture still images or moving images. The image capturing device 1410 may include one or more of a camera, a camcorder, and/or a webcam.

The user input device 1420 may receive various types of data input by a user of the system 1000 and include one or more of a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include one or more of a temperature sensor, a pressure sensor, an illuminance sensor, a position sensor, an acceleration sensor, a biosensor, and/or a gyroscope sensor.

The communication device 1440 may transmit and/or receive signals such as digital and/or analog signals between other devices outside the system 1000 according to various communication protocols. The communication device 1440 may include one or more of an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 7:
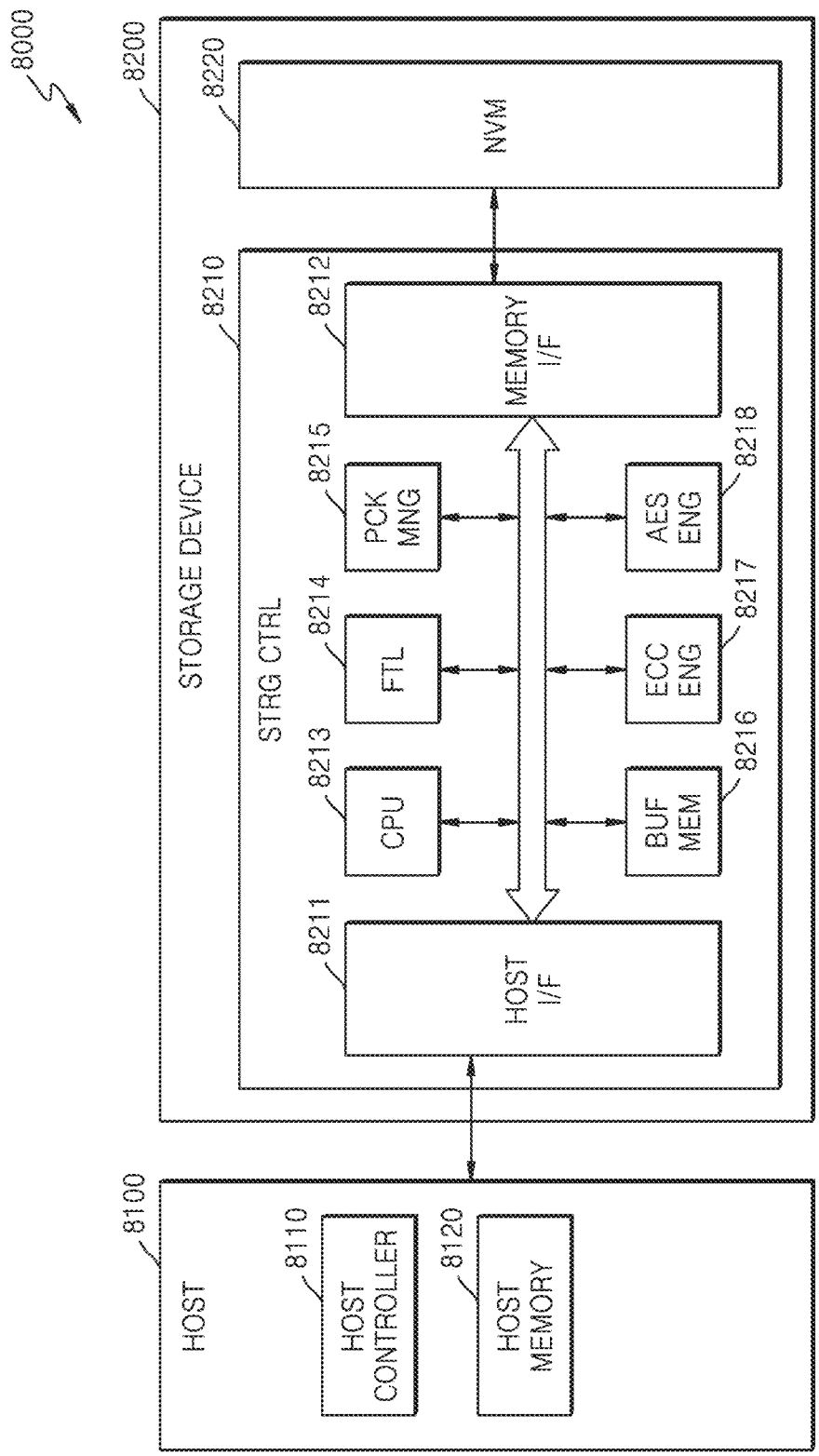
FIG. 7 is a block diagram of a host storage system according to some example embodiments.

FIG. 7 is a block diagram of a host storage system 8000 according to various example embodiments.

The host storage system 8000 may include a host 8100 and a storage device 8200. In addition, the storage device 8200 may include a memory controller 8210 and a NVM 8220. According to various example embodiments, the host 8100 may include a host controller 8110 and a host memory 8120. The host memory 8120 may be used as (e.g., may be configured to implement) a buffer memory configured to temporarily store data to be transmitted to or received from the storage device 8200.

In some example embodiments, the host 8100 and/or the storage device 8200 may correspond to the storage device 100 of FIG. 1. For example, the host 8100 and/or the storage device 8200 may perform the bandwidth control method described with reference to at least one of FIGS. 2 to 5.

The storage device 8200 may include a storage medium configured to store data in response to a request from the host 8100. As an example, the storage device 8200 may include at least one of an SSD, an embedded memory, or a removable external memory. When the storage device 8200 is an SSD, the storage device 8200 may be an NVMe compliant device. When the storage device 8200 is an embedded memory or an external memory, the storage device 8200 may be a device conforming to the UFS standard or eMMC standard. Both the host 8100 and the storage device 8200 may generate a packet and send the packet according to the adopted standard protocol.

When the NVM 8220 of the storage device 8200 includes a flash memory, the flash memory may include a 2D NAND storage array or a 3D (or vertical) NAND (VNAND) storage array. As another example, the storage device 8200 may include various other kinds of NVMs. For example, the storage device 8200 may include magnetic random access memory (MRAM), spin transfer torque MRAM, conductive bridge RAM (CBRAM), ferroelectric RAM (FRAM), PRAM, RRAM, and various other types of memory.

According to some example embodiments, the host controller 8110 and the host memory 8120 may be implemented as separate semiconductor chips. Alternatively, in some example embodiments, the host controller 8110 and the host memory 8120 may be integrated in the same semiconductor chip. As an example, the host controller 8110 may be any one of a plurality of modules included in an application processor (AP). The AP may be implemented as a system on chip (SOC). In addition, the host memory 8120 may be an embedded memory included in the AP or a memory module external to the AP.

The host controller 8110 may manage an operation of storing data (e.g., writing data) of the buffer area of the host memory 8120 in the NVM 8220 or an operation of storing data (e.g., reading data) of the NVM 8220 in the buffer area.

The memory controller 8210 may include a host interface 8211, a memory interface 8212, and a CPU 8213. In addition, the memory controller 8210 may also include a flash translation layer (FTL) 8214, a packet manager 8215, a buffer memory 8216, an error correction code (ECC) engine 8217, and an advanced encryption standard (AES) engine 8218. The memory controller 8210 may further include a working memory (not shown) in which FTL 8214 is loaded. The CPU 8213 may execute the FTL 8214 to control data writing and reading operations on the NVM 8220.

The host interface 8211 may send and receive packets to and from the host 8100. The packet sent from the host 8100 to the host interface 8211 may include a command or data to be written to the NVM 8220. The packet sent from the host interface 8211 to the host 8100 may include a response to the command or data read from the NVM 8220. The memory interface 8212 may send data to be written to the NVM 8220 or receive data read from the NVM 8220. The memory interface 8212 may be configured to conform to a standard protocol such as toggle or open NAND flash interface (ONFI).

The FTL 8214 may perform various functions, such as address mapping operation, wear balancing operation and garbage collection operation. The address mapping operation may be an operation of converting a logical address received from the host 8100 into a physical address used to actually store data in the NVM 8220. The wear balancing operation may be a technology of preventing excessive degradation of a specific block by allowing uniform use of NVM 8220 blocks. As an example, the wear balancing operation may be realized by using firmware technology to balance the erase count of physical blocks. The garbage collection operation may be a technology to ensure an available capacity in the NVM 8220 by erasing the existing blocks after copying the valid data of the existing blocks to the new blocks.

The packet manager 8215 may generate packets according to a protocol that agrees to the interface of the host 8100, or parse various types of information from packets received from the host 8100. In addition, the buffer memory 8216 may temporarily store data to be written to or read from the NVM 8220. Although the buffer memory 8216 may be a component included in the memory controller 8210, the buffer memory 8216 may be external to the memory controller 8210.

ECC engine 8217 may perform error detection and correction operations on the read data read from the NVM 8220. More specifically, ECC engine 8217 may generate parity bits for the write data to be written to the NVM 8220, and the generated parity bits may be stored in the NVM 8220 together with the write data. During reading data from the NVM 8220, ECC engine 8217 may use read data and the parity bit read from the NVM 8220 to correct the error in the read data, and output the read data after error correction.

The AES engine 8218 may perform at least one of an encryption operation or a decryption operation on the data input to the memory controller 8210 by using a symmetric key algorithm.

Figure 8:
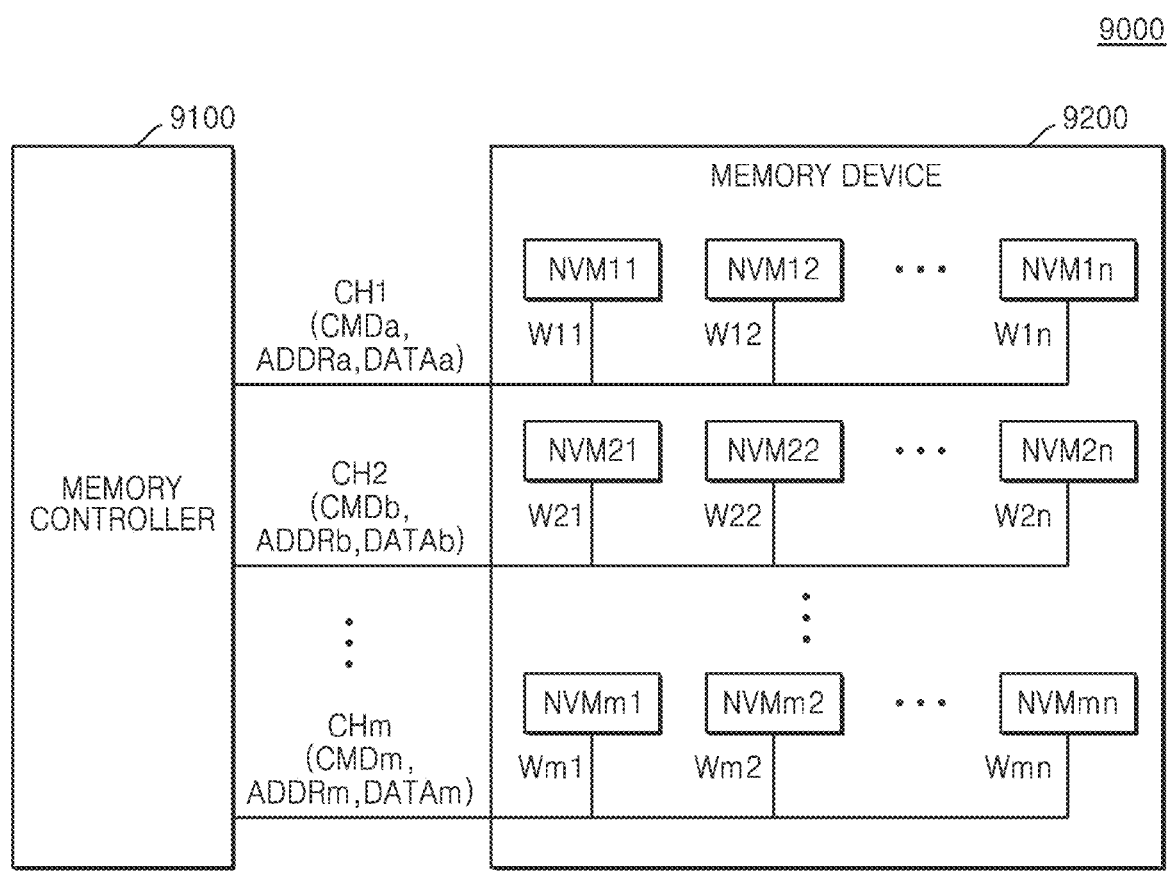
FIG. 8 is a block diagram of a storage system according to some example embodiments.

FIG. 8 is a block diagram of a storage system 9000 according to some example embodiments of the inventive concepts.

Referring to FIG. 8, the storage system 9000 may include a storage device 9200 and a memory controller 9100. The storage system 9000 may support multiple channels CH1 to CHm (m being any integer), and the storage device 9200 may be connected to the memory controller 9100 through the multiple channels CH1 to CHm. For example, the storage system 9000 may be implemented as a storage device such as an SSD.

In some example embodiments, the storage system 9000 may correspond to the storage device 100 of FIG. 1. The storage system 9000 may perform the bandwidth control method described with reference to at least one of FIGS. 2 to 5.

The storage device 9200 may include a plurality of NVM devices NVM11 to NVMmn (m and n each independently being any integer). Each of the NVM devices NVM11 to NVMmn may be connected to one of the plurality of channels CH1 to CHm through its corresponding way. For example, NVM devices NVM11 to NVM1$n$ may be connected to a first channel CH1 through paths W11 to W1$n$, and NVM devices NVM21 to NVM2$n$ may be connected to a second channel CH2 through paths W21 to W2$n$. In various example embodiments, each of the NVM devices NVM11 to NVM1$n$ may be implemented as any storage element, which may operate according to a separate command from the memory controller 9100. For example, each of the NVM devices NVM11 to NVM1$n$ may be implemented as a chip or die, but the inventive concepts are not limited thereto.

The memory controller 9100 may send and receive signals to and from the storage device 9200 through the plurality of channels CH1 to CHm (m being any integer). For example, the memory controller 9100 may send commands CMDa to CMDm, addresses ADDRa to ADDRm, and data DATAa to DATAm to the storage device 9200 through the channels CH1 to CHm, or receive data DATA DATAa to DATAm from the storage device 9200.

The memory controller 9100 may select one from the NVM devices NVM11 to NVMmn connected to each of the channels CH1 to CHm by using the corresponding one of the channels CH1 to CHm, and send and receive signals to and from the selected NVM device. For example, the memory controller 9100 may select the NVM device NVM11 from the NVM devices NVM11 to NVM1$n$ connected to the first channel CH1. The memory controller 9100 may send the command CMDa, address ADDRa and data DATAa to the selected NVM device NVM11 through the first channel CH1, or receive data DATAa from the selected NVM device NVM11.

The memory controller 9100 may send and receive signals to and from the storage device 9200 in parallel through channels different from each other. For example, the memory controller 9100 may send the command CMDa to the storage device 9200 through the first channel CH1 and the command CMDb to the storage device 9200 through the second channel CH2. For example, the memory controller 9100 may receive data DATAa from the storage device 9200 through the first channel CH1 and the data DATAb from the storage device 9200 through the second channel CH2.

The memory controller 9100 may control all operations of the storage device 9200. The memory controller 9100 may send signals to channels CH1 to CHm and control each of the NVM devices NVM11 to NVMmn connected to the channels CH1 to CHm. For example, the memory controller 9100 may send the command CMDa and the address ADDRa to the first channel CH1 and control one selected from the NVM devices NVM11 to NVM1$n$.

Each of the NVM devices NVM11 to NVMmn may be operated via the control of the memory controller 9100. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDRb provided to the second channel CH2, and send the read data DATAb to the memory controller 9100.

Although FIG. 8 shows an example in which the storage device 9200 communicates with the memory controller 9100 through M channels and includes N NVM devices corresponding to each channel, the number of channels and the number of NVM devices connected to one channel may be changed.

Figure 9:
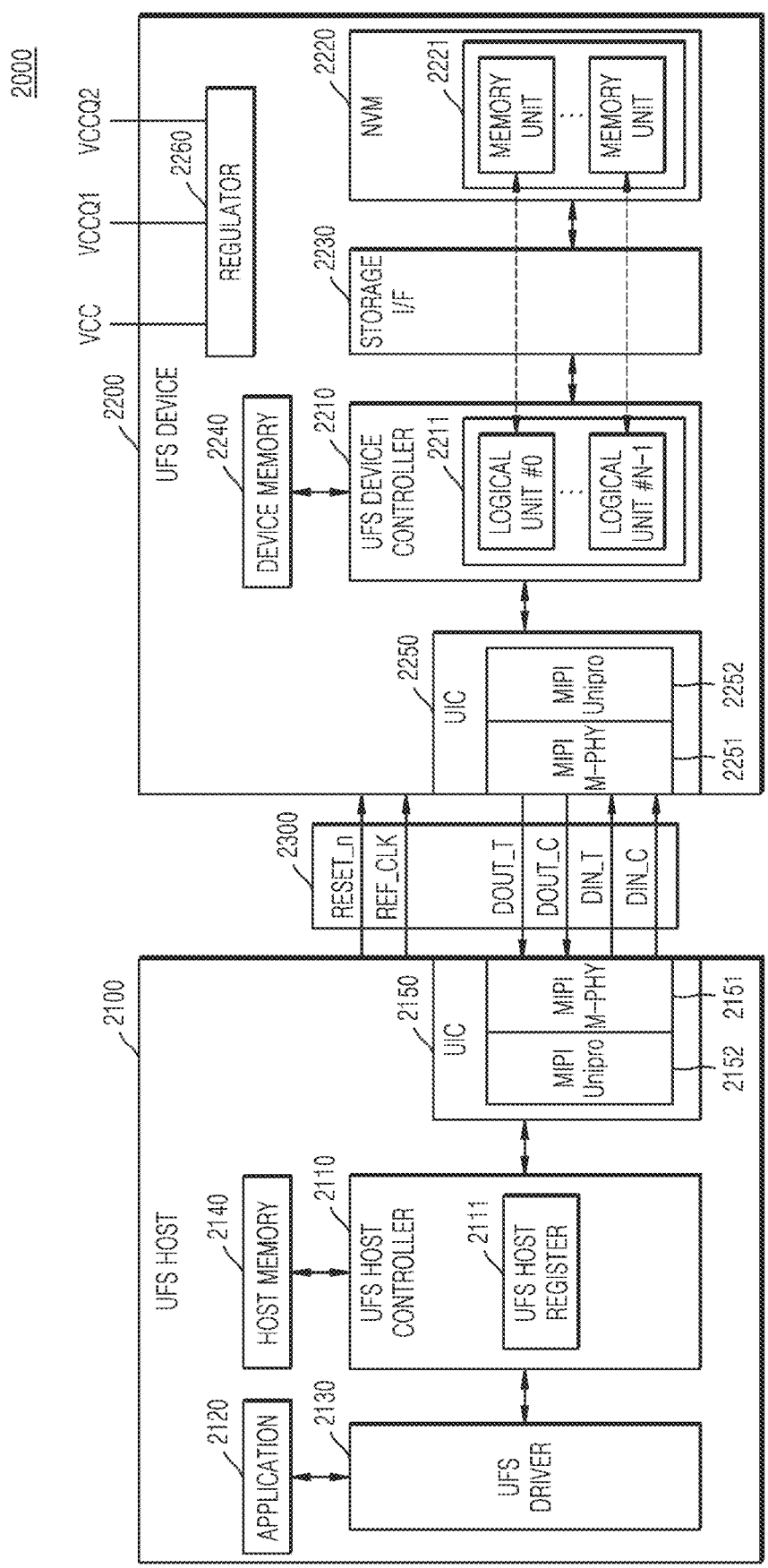
FIG. 9 is a block diagram of a UFS system according to some example embodiments.

FIG. 9 is a diagram of a UFS system 2000 according to some example embodiments.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 6 may also be applied to the UFS system 2000 of FIG. 9 within a range that does not conflict with the following description of FIG. 9.

In some example embodiments, the UFS host 2100 and/or the UFS device 2200 may correspond to the storage device 100 of FIG. 1. For example, the UFS host 2100 and/or the UFS device 2200 may perform the bandwidth control method described with reference to at least one of FIGS. 2 to 5.

Referring to FIG. 9, the UFS host 2100 may be connected to the UFS device 2200 through the UFS interface 2300. When the main processor 1100 of FIG. 9 is an AP, the UFS host 2100 may be implemented as a portion of the AP. The UFS host controller 2110 and the host memory 2140 may respectively correspond to the controller 1120 of the main processor 1100 and the memories 1200$a$ and 1200$b$ of FIG. 6. The UFS device 2200 may correspond to the storage devices 1300$a$ and 1300$b$ of FIG. 6, and a UFS device controller 2210 and an NVM 2220 may respectively correspond to the storage controllers 1310a and 1310b and the NVMs 1320a and 1320b of FIG. 6.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may be implemented by the UFS Host 2100, for example based on a processor of the UFS Host controller 2110 executing machine-readable instructions that may be stored at the UFS Host 2100, for example at the Host memory 2140. For example, the application 2120, when implemented by the UFS Host 2100, may cause the UFS Host 2100 to communicate with the UFS device 2200 to use functions of the UFS device 2200. The application 2120 (e.g., the UFS Host 2100 implementing the application 2120) may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on one side of the UFS host 2100 may include a mobile industry processor interface (MIPI) M-PHY 2151 and an MIPI UniPro 2152, and the UIC layer 2250 on one side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of the reference clock signal REF_CLK provided from the UFS host 2100 to the UFS device 2200 may be one of 19.2 MHz, 26 MHz, 38.4 MHz, or 52 MHz, without being limited thereto. The UFS host 2100 may change the frequency of the reference clock signal REF_CLK during the operation, for example, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. For example, the data rate may be determined depending on the frequency of the reference clock signal REF_CLK.

The UFS interface 2300 may support a plurality of channels, each of which may be implemented as a pair of differential lines. For example, the UFS interface 2300 may include at least one receiving channel and at least one transmission channel. In FIG. 9, a pair of lines configured to transmit a pair of differential input signals DIN_T and DIN_C may constitute or be included in a receiving channel, and a pair of lines configured to transmit a pair of differential output signals DOUT_T and DOUT_C may constitute or be included in a transmission channel. Although one transmission channel and one receiving channel are illustrated in FIG. 9, the number of transmission channels and the number of receiving channels may be changed.

The receiving channel and the transmission channel may transmit data based on a serial communication scheme. Full-duplex communications between the UFS host 2100 and the UFS device 2200 may be enabled due to a structure in which the receiving channel is separated from the transmission channel. For example, while receiving data from the UFS host 2100 through the receiving channel, the UFS device 2200 may transmit data to the UFS host 2100 through the transmission channel. In addition, control data (e.g., a command) from the UFS host 2100 to the UFS device 2200 and user data to be stored in or read from the NVM 2220 of the UFS device 2200 by the UFS host 2100 may be transmitted through the same channel. Accordingly, between the UFS host 2100 and the UFS device 2200, there may be no need to further provide a separate channel for data transmission in addition to a pair of receiving channels and a pair of transmission channels.

The UFS device controller 2210 of the UFS device 2200 may control up to all operations of the UFS device 2200. The UFS device controller 2210 may manage the NVM 2220 by using a logical unit (LU) 2211, which is a logical data memory cell. The number (e.g., quantity) of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size within a predetermined range. For example, a size such as a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As a non-limiting example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit the user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

Alternatively or additionally, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and store, e.g. temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in the read data by using the parity bits read from the NVM 2220 along with the read data, and output the error-corrected read data.

In addition, the UFS device controller 2210 may transmit the user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive the next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and within a range of 2.4 V to 3.6 V. The voltage VCCQ may be a power supply voltage for supplying a low voltage mainly to the UFS device controller 2210 and be within a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be within a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 10:
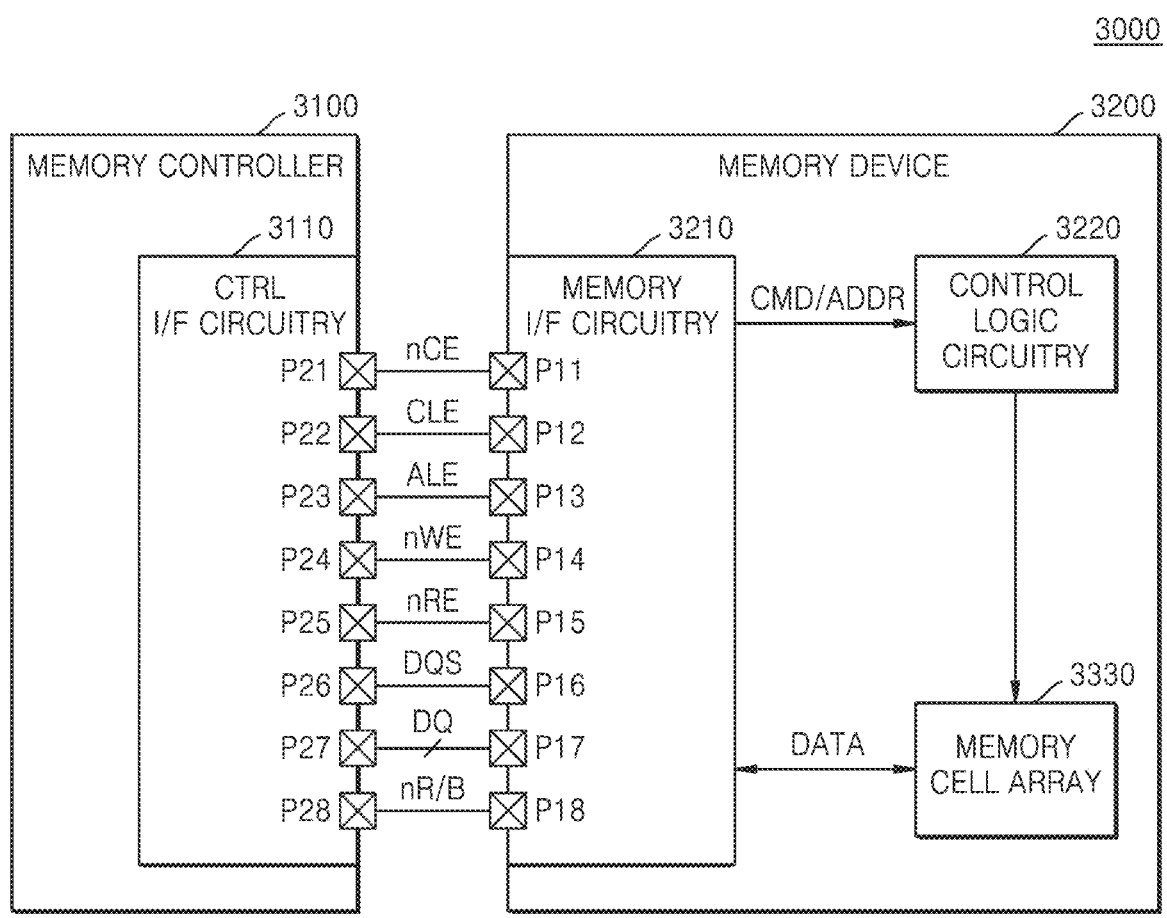
FIG. 10 is a block diagram of a storage system according to some example embodiments.

FIG. 10 is a block diagram of a storage system 3000 according to some example embodiments of the inventive concepts. Referring to FIG. 10, the storage system 3000 may include a storage device 3200 and a memory controller 3100. The storage device 3200 may correspond to one of the NVM devices NVM11 to NVMmn, which communicates with the memory controller 9100 based on one of the plurality of channels CH1 to CHm of FIG. 8. The memory controller 3100 may correspond to the memory controller 9100 of FIG. 8.

In some example embodiments, the storage system 3000 may correspond to the storage device 100 of FIG. 1. For example, the memory controller 3100 and/or the control logic circuit 3220 may perform the bandwidth control method described with reference to at least one of FIGS. 2 to 5.

The storage device 3200 may include first to eighth pins P11 to P18, a memory interface circuit 3210, a control logic circuit 3220, and a storage unit array 3330.

The memory interface circuit 3210 may receive a chip enable signal nCE from the memory controller 3100 through the first pin P11. The memory interface circuit 3210 may send and receive signals to and from the memory controller 3100 through the second to eighth pins P12 to P18 in response to the chip enable signal nCE. For example, when the chip enable signal nCE is in an enable state (e.g., low level), the memory interface circuit 3210 may send a signal to and receive a signal from the memory controller 3100 through the second to eighth pins P12 to P18.

The memory interface circuit 3210 may receive a command latch enable signal CLE, an address latch enable signal ALE, and a write enable signal nWE from the memory controller 3100 through the second to fourth pins P12 to P14. The memory interface circuit 3210 may receive the data signal DQ from the memory controller 3100 through the seventh pin P17 or send the data signal DQ to the memory controller 3100. Command CMD, address ADDR and data may be transmitted via data signal DQ. For example, the data signal DQ may be transmitted through a plurality of data signal lines. In this case, the seventh pin P17 may include a plurality of pins corresponding to a plurality of data signals DQ, respectively.

The memory interface circuit 3210 may obtain the command CMD from the data signal DQ received in the enable interval (e.g., a high-level state) of the command latch enable signal CLE based on a switching time point of the write enable signal nWE. The memory interface circuit 3210 may obtain the address ADDR from the data signal DQ received in the enable interval (e.g., a high-level state) of the address latch enable signal ALE based on the switching time point of the write enable signal nWE.

In various example embodiments, the write enable signal nWE may remain static (e.g., a high level or low level) and switch between the high level and the low level. For example, the write enable signal nWE may be switched in the interval where the command CMD or address ADDR is sent. Therefore, the memory interface circuit 3210 may obtain the command CMD or address ADDR based on the switching time point of the write enable signal nWE.

The memory interface circuit 3210 may receive the read enable signal nRE from the memory controller 3100 through the fifth pin P15. The memory interface circuit 3210 may receive the data strobe signal DQS from the memory controller 3100 through the sixth pin P16, or may send the data strobe signal DQS to the memory controller 3100.

In the data (DATA) output operation of the storage device 3200, the memory interface circuit 3210 may receive the read enable signal nRE switched by the fifth pin P15 before outputting the data DATA. The memory interface circuit 3210 may generate a data strobe signal DQS, which is switched based on the switching of the read enable signal nRE. For example, the memory interface circuit 3210 may generate a data strobe signal DQS based on the switching start time of the read enable signal nRE, which starts switching after a predetermined delay (e.g., tDQSRE). The memory interface circuit 3210 may transmit a data signal DQ including data DATA based on the switching time point of the data strobe signal DQS. Therefore, the data DATA may be aligned with the switching time point of the data strobe signal DQS and transmitted to the memory controller 3100.

In the data (DATA) input operation of the storage device 3200, when the data signal DQ including data DATA is received from the memory controller 3100, the memory interface circuit 3210 may receive the switched data strobe signal DQ and the data DATA. The memory interface circuit 3210 may obtain the data DATA from the data signal DQ based on the switching time point of the data strobe signal DQS. For example, the memory interface circuit 3210 may sample the data signal DQ at the rising and falling edges of the data strobe signal DQS and obtain data DATA.

The memory interface circuit 3210 may send the ready/busy output signal nR/B to the memory controller 3100 through the eighth pin P18. The memory interface circuit 3210 may transmit status information of the storage device 3200 to the memory controller 3100 through the ready/busy output signal nR/B. When the storage device 3200 is in a busy state (i.e., when an operation is being performed in the storage device 3200), the memory interface circuit 3210 may send a ready/busy output signal nR/B indicating the busy state to the memory controller 3100. When the storage device 3200 is in a ready state (i.e., when no operation is performed or completed in the storage device 3200), the memory interface circuit 3210 may send the ready/busy output signal nR/B indicating the ready state to the memory controller 3100. For example, when the storage device 3200 reads data from the storage unit array 3330 in response to a page reading command, the memory interface circuit 3210 may send a ready/busy output signal nR/B indicating a busy state (e.g., a low level) to the memory controller 3100. For example, when the storage device 3200 programs the data DATA to the storage unit array 3330 in response to a programming command, the memory interface circuit 3210 may send the ready/busy output signal nR/B indicating the busy state to the memory controller 3100.

The control logic circuit 3220 may control all operations of the storage device 3200. The control logic circuit 3220 may receive a command/address CMD/ADDR obtained from the memory interface circuit 3210. The control logic circuit 3220 may generate control signals for controlling other components of the storage device 3200 in response to the received command/address CMD/ADDR. For example, the control logic circuit 3220 may generate various control signals for programming data DATA to or reading data DATA from the storage unit array 3330.

The storage unit array 3330 may store the data DATA obtained from the memory interface circuit 3210 via the control of the control logic circuit 3220. The storage unit array 3330 may output the stored data DATA to the memory interface circuit 3210 via the control of the control logic circuit 3220.

The storage unit array 3330 may include a plurality of storage units. For example, a plurality of storage units may be flash memory units. However, the inventive concepts are not limited thereto, and the storage unit may be an RRAM unit, an FRAM unit, a PRAM unit, a thyristor RAM (TRAM) unit or an MRAM unit. Hereinafter, some example embodiments in which the storage unit is a NAND flash memory unit will be mainly described.

The memory controller 3100 may include first to eighth pins P21 to P28 and a controller interface circuit 3110. The first to eighth pins P21 to P28 may correspond to the first to eighth pins P11 to P18 of the storage device 3200, respectively.

The controller interface circuit 3110 may send the chip enable signal nCE to the storage device 3200 through the first pin P21. The controller interface circuit 3110 may send a signal to and receive a signal from the storage device 3200 through the second to eighth pins P22 to P28, wherein the storage device 3200 is selected by the chip enable signal nCE.

The controller interface circuit 3110 may send the command latch enable signal CLE, the address latch enable signal ALE and the write enable signal nWE to the storage device 3200 through the second to fourth pins P22 to P24. The controller interface circuit 3110 may send or receive the data signal DQ to or from the storage device 3200 through the seventh pin P27.

The controller interface circuit 3110 may transmit the data signal DQ including the command CMD or address ADDR and the switched write enable signal nWE to the storage device 3200. The controller interface circuit 3110 may transmit the data signal DQ including the command CMD to the storage device 3200 by transmitting the command latch enable signal CLE with the enable state. Moreover, the controller interface circuit 3110 may transmit the data signal DQ including the command CMD to the storage device 3200 through the address latch enable signal ALE having an enable state to transmit the data signal DQ including the address ADDR to the storage device 3200.

The controller interface circuit 3110 may send the read enable signal nRE to the storage device 3200 through the fifth pin P25. The controller interface circuit 3110 may receive the data strobe signal DQS from the storage device 3200 or send the data strobe communication signal DQS to the storage device 3200 through the sixth pin P26.

In the data (DATA) output operation of the storage device 3200, the controller interface circuit 3110 may generate the switched read enable signal nRE and send the read enable signal nRE to the storage device 3200. For example, before outputting the data DATA, the controller interface circuit 3110 may generate the read enable signal nRE from a static state (e.g., a high level or a low level). Therefore, the storage device 3200 may generate the switched data strobe signal DQS based on the read enable signal nRE. The controller interface circuit 3110 may receive the data signal DQ including the data DATA and the switched data strobe signal DQS from the storage device 3200. The controller interface circuit 3110 may obtain data DATA from the data signal DQ based on the switching time point of the data strobe signal DQS.

During the data (DATA) input operation of the storage device 3200, the controller interface circuit 3110 may generate a switched data strobe signal DQS. For example, before transmitting the data DATA, the controller interface circuit 3110 may generate a data strobe signal DQS from a static state (e.g., a high level or a low level), which may transmit the data signal DQ including the data DATA to the storage device 3200 based on the switching time point of the data strobe signal DQS.

The controller interface circuit 3110 may receive the ready/busy output signal NR/B from the storage device 3200 through the eighth pin P28. The controller interface circuit 3110 may determine the status information of the storage device 3200 based on the ready/busy output signal nR/B.

Figure 11:
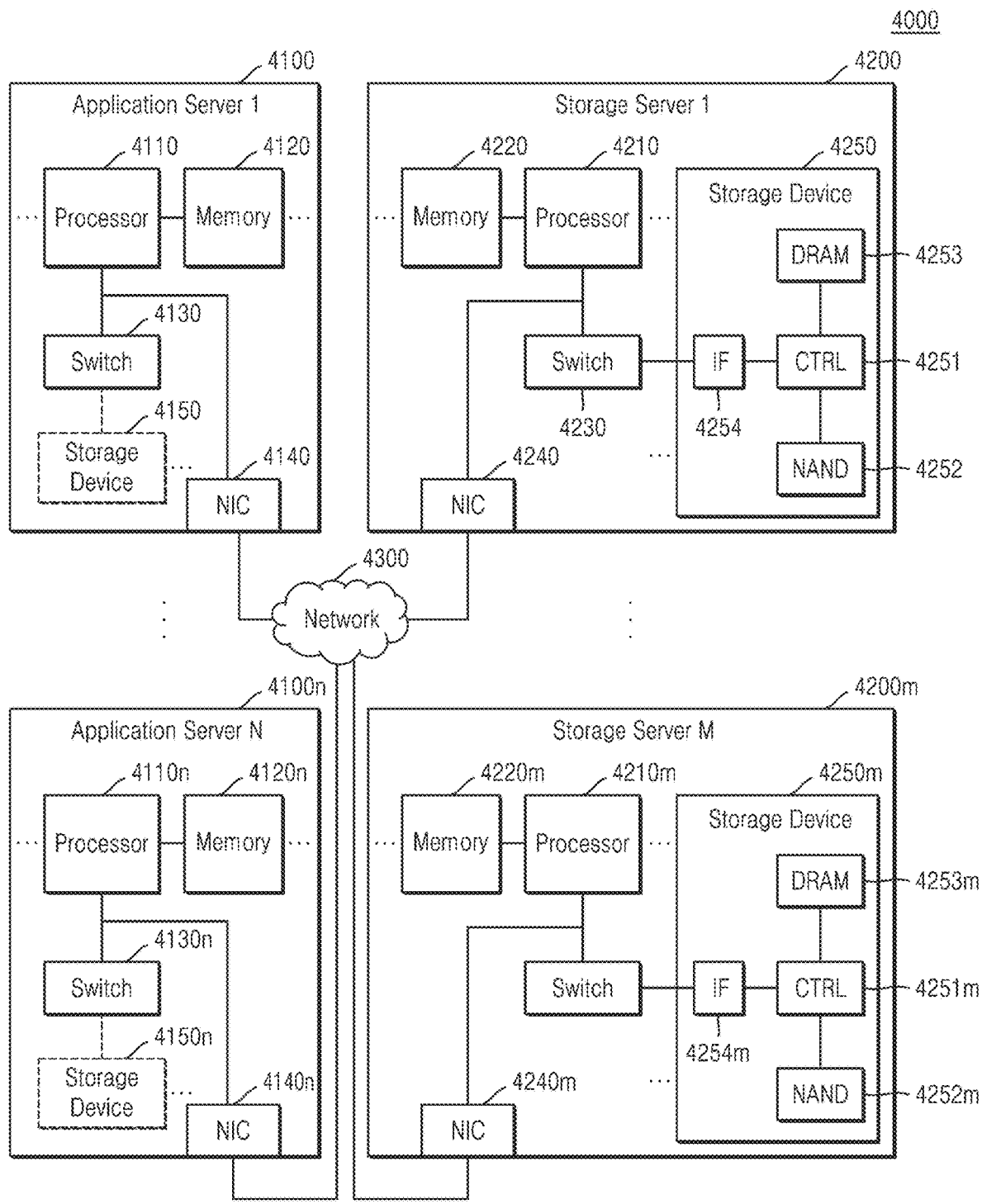
FIG. 11 is a block diagram of a data center to which a storage device is applied according to some example embodiments.

FIG. 11 is a block diagram of a data center 4000 to which a storage device is applied according to some example embodiments of the inventive concepts.

Referring to FIG. 11, the data center 4000 may be a facility for collecting various types of data and providing services, and is referred to as a data storage center. The data center 4000 may be a system for operating search engines and databases, and may be a computing system used by companies (such as banks) or government agencies. The data center 4000 may include application servers 4100 to 4100n and storage servers 4200 to 4200m, where n and m may each independently be any integer. According to some example embodiments, the number of application servers 4100 to 4100n and the number of storage servers 4200 to 4200m may be selected differently. The number of application servers 4100 to 4100n and the number of storage servers 4200 to 4200m may be different from each other.

In some example embodiments, the storage server 4200 and/or the application server 4100 may correspond to the storage device 100 of FIG. 1. For example, the application server 4100 or the storage server 4200 may perform the bandwidth control method described with reference to at least one of FIGS. 2 to 5.

The application server 4100 or the storage server 4200 may include at least one of processors 4110 or 4210 and at least one of memories 4120 or 4220. The processor 4110 may control all operations of the application server 4100, access the memory 4120, and execute instructions and/or data loaded into the memory 4120. The memory 4120 may be a dual data rate synchronous DRAM (DDR SDRAM), a high bandwidth memory (HBM), a hybrid memory cube (HMC), a dual in-line memory module (DIMM), an otane DIMM, or a nonvolatile DIMM (NVDIMM). The application server 4100 may include a switch 4130 and a network interface card (NIC) 4140. The switch 4130 may selectively connect the processor 4110 to the storage device 4150 via the control of the processor 4110, or selectively connect the MC 4140 to the storage device 4150.

The storage server 4200 will now be described as an example. The processor 4210 may control all operations of the storage server 4200, access the memory 4220, and execute instructions and/or data loaded into the memory 4220. The memory 4220 may be a dual data rate synchronous DRAM (DDR SDRAM), a high bandwidth memory (HBM), a hybrid memory cube (HMC), a dual in-line memory module (DIMM), an otane DIMM, or a nonvolatile DIMM (NVDIMM). In some example embodiments, the number of processors 4210 and the number of memories 4220 included in the storage server 4200 may be selected differently. In various example embodiments, the processor 4210 and the memory 4220 may provide a processor-memory pair. In some example embodiments, the number of processors 4210 and the number of memories 4220 may be different from each other. The processor 4210 may include a single core processor or a multi-core processor. The above description of the storage server 4200 may be similarly applied to the application server 4100. In some example embodiments, the application server 4100 may not include a storage device 4150 (e.g., may not include any storage device 4150). The storage server 4200 may include at least one storage device 4250. According to some example embodiments, the number of storage devices 4250 included in the storage server 4200 may be selected differently.

Application servers 4100 to 4100n may communicate with storage servers 4200 to 4200m over network 4300. The network 4300 may be implemented by using fibre channel (FC) and/or Ethernet. In this case, FC may be a medium for relatively high-speed data transmission, and optical switches with high performance and high availability may be used. According to an access method of the network 4300, the storage servers 4200 to 4200m may be set as file storage, block storage or object storage.

In some example embodiments, the network 4300 may be or may include or be included in a network dedicated to storage, such as a storage area network (SAN). For example, a San may be, include, or be included in a FC-SAN that uses an FC network and is implemented according to the FC protocol (FCP). As another example, the San may be an Internet Protocol (IP)-SAN, which uses a transmission control protocol (TCP)/IP network and is implemented according to SCSI over TCP/IP or Internet SCSI (iSCSI) protocol. In some example embodiments, the network 4300 may be, include, or be included in a general-purpose network, such as a TCP/IP network. For example, the network 4300 may be implemented according to protocols such as FC (FCoE) over Ethernet, network attached storage (NAS), and fabric NVMe (NVMe-oF).

Hereinafter, the application server 4100 and the storage server 4200 will be mainly described. The description of the application server 4100 may be applied to another application server 4100n, and the description of the storage server 4200 may be applied to another storage server 4200m.

The application server 4100 may store the data requested to be stored by the user or the client in one of the storage servers 4200 to 4200m over the network 4300. In addition, the application server 4100 may obtain data requested to be read by a user or a client from one of the storage servers 4200 to 4200m over the network 4300. For example, the application server 4100 may be implemented as a network server and/or a database management system (DBMS).

The application server 4100 may access the memory 4120n or the storage device 4150n included in another application server 4100n over the network 4300. Alternatively, the application server 4100 may access the memories 4220 to 4220m or storage devices 4250 to 4250m included in the storage servers 4200 to 4200m over the network 4300. Therefore, the application server 4100 may perform various operations on the data stored in the application servers 4100 to 4100n and/or the storage servers 4200 to 4200m. For example, the application server 4100 may execute instructions for moving or copying data between the application servers 4100 to 4100n and/or the storage servers 4200 to 4200m. In this case, data may be moved from the storage devices 4250 to 4250m of the storage servers 4200 to 4200m through the memories 4220 to 4220m of the storage servers 4200 to 4200m or directly to the memories 4120 to 4120n of the application servers 4100 to 4100*n*. The data moved through the network 4300 may be data encrypted for security or privacy.

The storage server 4200 will now be described as an example. The interface 4254 may provide a physical connection between the processor 4210 and the controller 4251 and a physical connection between the network interface card (NIC) 4240 and the controller 4251. For example, the interface 4254 may be implemented using a direct attached storage (DAS) scheme, where the storage device 4250 is directly connected to a dedicated cable. For example, the interface 4254 may be implemented by using various interface schemes, such as ATA, SATA, E-SATA, SCSI, SAS, PCI, PCIe, NVMe, IEEE 1394, USB interface, SD card interface, MMC interface, eMMC interface, UFS interface, eUFS interface and CF card interface.

The storage server 4200 may further include a switch 4230 and a network interface card (NIC) 4240. The switch 4230 may selectively connect the processor 4210 to the storage device 4250 via the control of the processor 4210, or selectively connect the NIC 4240 to the storage device 4250.

In some example embodiments, the NIC 4240 may include a network interface card and a network adapter. The NIC 4240 may be connected to the network 4300 through wired interface, wireless interface, Bluetooth interface or optical interface. The NIC 4240 may include an internal memory, a digital signal processor (DSP), and a host bus interface, and is connected to the processor 4210 and/or the switch 4230 through a host bus interface. The host bus interface may be implemented as one of the above examples of interface 4254. In some example embodiments, the NIC 4240 may be integrated with at least one of processor 4210, switch 4230, or storage device 4250.

In storage servers 4200 to 4200*m* or application servers 4100 to 4100*n*, the processor may send commands to storage devices 4150 to 4150*n* and 4250 to 4250*m* or memories 4120 to 4120*n* and 4220 to 4220*m* and program or read data. In this case, the data may be the wrong data corrected by the ECC engine. The data may be data on which a data bus inversion (DBI) operation or a data masking (DM) operation is performed, and may include cyclic redundancy coding (CRC) information. Data may be encrypted for security or privacy.

The storage devices 4150 to 4150*n* and 4250 to 4250*m* may send control signals and command/address signals to the NAND flash memory devices 4252 to 4252*m* in response to a read command received from the processor. Therefore, when reading data from the NAND flash memory devices 4252 to 4252*m,* the read enable (RE) signal may be input as the data output control signal. Therefore, the data may be output to the DQ bus. The RE signal may be used to generate the data strobe signal DQS. Depending on the rising or falling edge of the write enable (WE) signal, the command and address signals may be locked in the page buffer.

The controller 4251 may control all operations of the storage device 4250. In some example embodiments, the controller 4251 may include an SRAM. The controller 4251 may write data to the NAND flash memory device 4252 in response to a write command or read data from the NAND flash memory device 4252 in response to a read command. For example, write commands and/or read commands may be provided from the processor 4210 of the storage server 4200, the processor 4210*m* of another storage server 4200*m,* or processors 4110 and 4110*n* of application servers 4100 and 4100*n*. The DRAM 4253 may temporarily store (or buffer) data to be written to or read from the NAND flash memory device 4252. Also, DRAM 4253 may store metadata. Here, the metadata may be user data or data generated by the controller 4251 for managing the NAND flash memory device 4252. The storage device 4250 may include a security element (SE) for security or privacy.

According to one or more example embodiments, the above-described methods according to any of the example embodiments may be implemented using hardware, a combination of hardware and software, or a non-transitory storage medium storing executable software for performing its functions.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is performed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a dedicated processor. In another example, the hardware device may be an integrated circuit customized into a dedicated circuitry (e.g., an ASIC).

A hardware device, such as a computer processing device, may run an operating system (OS) and one or more software applications that run on the OS. The computer processing device may also access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software may also be distributed over network coupled computer systems so that the software is stored and performed in a distributed fashion. In particular, for example, software and data may be stored by one or more computer readable recording mediums, including tangible or non-transitory computer-readable storage media as discussed herein.

For example, according to various example embodiments, there is provided a computer-readable storage medium storing a computer program, wherein when the computer program is performed by a processor, at least the following the bandwidth control method is implemented: determining a target bandwidth expected when an application uses a storage device; calculating a bandwidth difference between the target bandwidth and an allocation bandwidth allocated to the application by the storage device; and adjusting the allocation bandwidth to the target bandwidth based on the bandwidth difference. In addition, some methods according to some example embodiments of the inventive concepts may also be similarly implemented by a computer-readable storage medium storing the computer program.

Storage media may also include one or more storage devices of units and/or devices according to one or more example embodiments. The one or more storage devices may be tangible or non-transitory computer-readable storage media, such as random access memory (RAM), read only memory (ROM), a permanent mass storage device (such as a disk drive), and/or any other similar data storage structure capable of storing and recording data. The one or more storage devices may be configured to store computer programs, program code, instructions, or some combination thereof, for one or more operating systems and/or for implementing the example embodiments described herein. The computer programs, program code, instructions, or some combinations thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combinations thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combinations thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of the example embodiments.

According to one or more example embodiments, any devices, systems, units, modules, blocks, and/or portions thereof according to any of the example embodiments (e.g., the storage device 100, the memory device 110, the processor 120, the system 1000, the main processor 1100, the memories 1200*a* and 1200*b*, the storage devices 1300*a* and 1300*b*, the image capturing device 1410, the user input device 1420, the sensor 1430, the communication device 1440, the display 1450, the speaker 1460, the power supplying device 1470, the connecting interface 1480, the host storage system 8000, the host 8100, the host controller 8110, the host memory 8120, the storage device 8200, the memory controller 8210, the NVM 8220, the host interface 8211, the memory interface 8212, the CPU 8213, the FTL 8214, the packet manager 8215, the buffer memory 8216, the ECC engine 8217, the AES engine 8218, the storage system 9000, the memory controller 9100, the storage device 9200, the UFS system 2000, the UFS host 2100, the UFS host controller 2110, the UFS Host register 2111, the application 2120, the UFS driver 2130, the host memory 2140, the UFS interconnect (UIC) layer 2150, the UFS device 2200, the UFS device controller 2210, the LU 2211, the NVM 2220, the storage interface 2230, the device memory 2240, the UIC layer 2250, the regulator 2260, the UFS interface 2300, the storage system 3000, the memory controller 3100, the memory device 3200, the control logic circuitry 3220, the memory cell array 3330, the data center 4000, the application servers 4100 to 4100*n*, the storage servers 4200 to 4200*m*, the processors 4110 and/or 4210, the memories 4120 and/or 4220, the switches 4130 and/or 4230, the storage devices 4150 and/or 4250, the NICs 4140 and/or 4240, or any portion thereof), or the like may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD) device, storing a program of instructions, and a processor (e.g., a CPU) configured to execute the program of instructions to implement the functionality and/or methods performed by some or all of any devices, systems, modules, units, controllers, and/or portions thereof according to any of the example embodiments, and/or any portions thereof.

The contents described about are illustrative of example embodiments and are not to be construed as limitations thereof. Although a few example embodiments have been described, those of ordinary skill in the art will readily appreciate that many modifications are possible in the example embodiments without materially departing from the novel teachings and advantages of the example embodiments of the present inventive concepts. Accordingly, all such modifications are intended to be included within the scope of example embodiments of the present inventive concepts as defined in the claims. Therefore, it is to be understood that the foregoing is illustrative of various example embodiments and is not to be construed as limitation to the specific example embodiments disclosed, and that the modifications to the disclosed example embodiments, as well as other example embodiments, are intended to be included within the scope of the appended claims.

What is claimed is:

1. A bandwidth control method, the bandwidth control method comprising:
   determining a target bandwidth expected when an application uses a storage device;
   calculating a bandwidth difference between the target bandwidth and an allocation bandwidth allocated to the application by the storage device;
   adjusting the allocation bandwidth to the target bandwidth based on the bandwidth difference, wherein the adjusting of the allocation bandwidth to the target bandwidth includes
      in response to a determination that the bandwidth difference is positive, determining a difference value between the target bandwidth and the allocation bandwidth, and
      determining a number of zones corresponding to the difference value, wherein
         the number of the zones corresponding to the difference value includes a number of memory cells of the storage device,
         the number of the zones corresponding to the difference value is determined based on the bandwidth difference between the target bandwidth and the allocation bandwidth, and a bandwidth corresponding to a single memory cell of the storage device, and
         the determining of the number of the zones corresponding to the difference value is based on,
         determining whether the number of the zones corresponding to the difference value is available in a free zone pool, wherein the free zone pool includes unallocated memory cells of the storage device, and
         in response to determining that the number of the zones corresponding to the difference value is not available in the free zone pool, adjusting a number of zones in the free zone pool to establish an adjusted number of zones in the free zone pool, and determining the number of the zones corresponding to the difference value based on the adjusted number of the zones in the free zone pool; and
   causing the application to be implemented such that the application uses the storage device based on utilizing the target bandwidth.

2. The bandwidth control method according to claim 1, wherein the adjusting of the allocation bandwidth to the target bandwidth comprises:
   adjusting the allocation bandwidth to the target bandwidth based on allocating the number of the zones corresponding to the difference value to the application.

3. The bandwidth control method according to claim 2, wherein the determining of the number of the zones corresponding to the difference value further comprises:
   in response to determining that the number of the zones corresponding to the difference value is available in the free zone pool, determining that the number of the zones in the free zone pool is the number of the zones corresponding to the difference value.

4. The bandwidth control method according to claim 3, wherein the adjusting the number of the zones in the free zone pool and determining the number of the zones corresponding to the difference value based on the adjusted number of the zones in the free zone pool comprises:
   determining whether there is at least one other application of which zones are able to be released;
   in response to determining that there is at least one other application of which zones are able to be released, releasing one or more zones used by the at least one other application; and
   in response to determining that there is not at least one other application of which zones are able to be released, determining all zones in the free zone pool as the number of the zones corresponding to the difference value,
      wherein a priority of allocating a bandwidth to the at least one other application is lower than a priority of allocating a bandwidth to the application, and a bandwidth of the at least one other application after the one or more zones are released is greater than or equal to an expected bandwidth of the at least one other application.

5. The bandwidth control method according to claim 1, wherein the adjusting of the allocation bandwidth to the target bandwidth comprises
   in response to a determination that the bandwidth difference is negative, such that the target bandwidth is a bandwidth less than the allocation bandwidth, determining a separate difference value between the allocation bandwidth and the target bandwidth,
      determining a number of zones corresponding to the separate difference value between the allocation bandwidth and the target bandwidth from among zones used by the application; and
      adjusting the allocation bandwidth to the target bandwidth by releasing the number of the zones corresponding to the separate difference value.

6. The bandwidth control method according to claim 1, wherein the determining of the target bandwidth expected when the application uses the storage device comprises:
   calculating a usage bandwidth when the application uses the storage device; and
   determining the target bandwidth based on the usage bandwidth.

7. The bandwidth control method according to claim 6, wherein the determining of the target bandwidth comprises:
   determining the target bandwidth as the usage bandwidth.

8. The bandwidth control method according to claim 6, wherein the calculating of the usage bandwidth comprises:
   detecting a plurality of data amount that is communicated between the application and the storage device during each time period of a plurality of time periods, respectively, wherein each time period of the plurality of time periods corresponds to a same amount of time;
   obtaining a plurality of sub-bandwidths respectively by dividing the plurality of data amount by the same amount of time; and
   determining an average of the plurality of sub-bandwidths as the usage bandwidth.

9. The bandwidth control method according to claim 1, wherein the storage device includes a zoned namespace solid state drive (ZNS SSD).

10. A storage device, the storage device comprising:
    a memory device comprising a plurality of memory units configured to store data for an application; and
    a processor configured to execute machine-readable instructions to
       determine a target bandwidth expected when the application uses the storage device, calculate a bandwidth difference between the target bandwidth and an allocation bandwidth allocated to the application by the storage device, adjust the allocation bandwidth to the target bandwidth based on the bandwidth difference, wherein, in adjusting of the allocation bandwidth to the target bandwidth, the processor is configured to, in response to a determination that the bandwidth difference is positive, determine a difference value between the target bandwidth and the allocation bandwidth, and determine a number of zones corresponding to the difference value, wherein the number of the zones corresponding to the difference value includes a number of memory cells of the storage device, the number of the zones corresponding to the difference value are determined based on the bandwidth difference between the target bandwidth and the allocation bandwidth, and a bandwidth corresponding to a single memory cell of the storage device, and the determining of the number of the zones corresponding to the difference value is based on, determining whether the number of the zones corresponding to the difference value is available in a free zone pool, wherein the free zone pool includes unallocated memory cells of the storage device, and in response to determining that the number of the zones corresponding to the difference value is not available in the free zone pool, the processor is configured to adjust a number of zones in the free zone pool to establish an adjusted number of zones in the free zone pool and determine the number of the zones corresponding to the difference value based on the adjusted number of the zones in the free zone pool; and cause the application to be implemented such that the application uses the memory device based on utilizing the target bandwidth.

11. The storage device according to claim 10, wherein the processor is configured to execute the machine-readable instructions to:

adjust the allocation bandwidth to the target bandwidth based on allocating the number of the zones to the application.

12. The storage device according to claim 11, wherein the processor is configured to execute the machine-readable instructions to:

in response to determining that the number of the zones corresponding to the difference value is available in the free zone pool, determine that the number of the zones in the free zone pool is the number of the zones corresponding to the difference value.

13. The storage device according to claim 12, wherein the processor is configured to execute the machine-readable instructions to:

determine whether there is at least one other application of which zones are able to be released;

in response to determining that there is at least one other application of which zones are able to be released, release one or more zones used by the at least one other application; and in response to determining that there is not at least one other application of which zones are able to be released, determine all zones in the free zone pool as the number of the zones corresponding to the difference value, wherein a priority of allocating a bandwidth to the at least one other application is lower than a priority of allocating a bandwidth to the application, and a bandwidth of the at least one other application after the one or more zones are released is greater than or equal to an expected bandwidth of the at least one other application.

14. The storage device according to claim 10, wherein the processor is configured to execute the machine-readable instructions to:

in response to a determination that the bandwidth difference is negative, such that the target bandwidth is a bandwidth less than the allocation bandwidth, determine a separate difference value between the allocation bandwidth and the target bandwidth, determine a number of zones corresponding to the separate difference value between the allocation bandwidth and the target bandwidth from among zones used by the application; and adjust the allocation bandwidth to the target bandwidth by releasing the number of the zones corresponding to the separate difference value.

15. The storage device according to claim 10, wherein the processor is configured to execute the machine-readable instructions to:

calculate usage bandwidth when the application uses the storage device; and determine the target bandwidth based on the usage bandwidth.

16. The storage device according to claim 15, wherein the processor is configured to execute the machine-readable instructions to:

determine the target bandwidth as the usage bandwidth.

17. The storage device according to claim 15, wherein the processor is configured to execute the machine-readable instructions to:

detect a plurality of data amount that is communicated between the application and the storage device during each time period of a plurality of time periods, respectively, wherein each time period of the plurality of time periods corresponds to a same amount of time;

obtain a plurality of sub-bandwidths respectively by dividing the plurality of data amount by the same amount of time; and determine an average of the plurality of sub-bandwidths as the usage bandwidth.

18. The storage device according to claim 10, wherein the storage device includes a zoned namespace solid state drive (ZNS SSD).

19. A storage system, the storage system comprising:

a memory device comprising a plurality of memory units configured to store data for an application; and a memory controller configured to communicate with the memory device through a channel, wherein the memory controller is configured to determine a target bandwidth expected when the application uses the memory device, calculate a bandwidth difference between the target bandwidth and an allocation bandwidth allocated to the application by the memory device, and adjust the allocation bandwidth to the target bandwidth based on the bandwidth difference, wherein, in adjusting of the allocation bandwidth to the target bandwidth, the memory controller is configured to, in response to a determination that the bandwidth difference is positive, determine a difference value between the target bandwidth and the allocation bandwidth, and determine a number of zones corresponding to the difference value, wherein the number of the zones corresponding to the difference value includes a number of memory cells of the memory device, the number of the zones corresponding to the difference value are determined based on the bandwidth difference between the target bandwidth and the allocation bandwidth, and a bandwidth corresponding to a single memory cell of the memory device, and the determining of the number of the zones corresponding to the difference value is based on, determining whether the number of the zones corresponding to the difference value is available in a free zone pool, wherein the free zone pool includes unallocated memory cells of the memory device, and in response to determining that the number of the zones is not available in the free zone pool, the memory controller is configured to adjust a number of zones in the free zone pool to establish an adjusted number of zones in the free zone pool and determine the number of the zones corresponding to the difference value based on the adjusted number of the zones in the free zone pool; and cause the application to be implemented such that the application uses the memory device based on utilizing the target bandwidth.

20. The storage system according to claim 19, wherein the memory device includes a zoned namespace solid state drive (ZNS SSD).

* * * * *